US012694120B2

(12) United States Patent
Nyman et al.

(10) Patent No.: US 12,694,120 B2
(45) Date of Patent: Jul. 28, 2026

(54) FIRST NODE, SECOND NODE, THIRD NODE, COMPUTING SYSTEM AND METHODS PERFORMED THEREBY FOR HANDLING INFORMATION INDICATING ONE OR MORE FEATURES SUPPORTED BY A PROCESSOR

(71) Applicant: Telefonaktiebolaget LM Ericsson (publ), Stockholm (SE)

(72) Inventors: Thomas Nyman, Sollentuna (SE); Merve Turhan, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 151 days.

(21) Appl. No.: 18/699,298

(22) PCT Filed: Oct. 7, 2021

(86) PCT No.: PCT/SE2021/050986
§ 371 (c)(1),
(2) Date: Apr. 7, 2024

(87) PCT Pub. No.: WO2023/059232
PCT Pub. Date: Apr. 13, 2023

(65) Prior Publication Data
US 2024/0427898 A1 Dec. 26, 2024

(51) Int. Cl.
*G06F 15/177* (2006.01)
*G06F 9/00* (2018.01)
(Continued)

(52) U.S. Cl.
CPC ............ *G06F 21/575* (2013.01); *G06F 21/64* (2013.01)

(58) Field of Classification Search
CPC .... G06F 21/575; G06F 21/64; G06F 9/45558; G06F 2009/45587; G06F 21/53;
(Continued)

(56) References Cited

U.S. PATENT DOCUMENTS 10,635,821 B2 * 4/2020 Cheng ..................... G06F 21/44
10,853,494 B2 12/2020 Subramanian et al.
(Continued)

FOREIGN PATENT DOCUMENTS

WO 2020143906 A1 7/2020
WO 2021004636 A1 1/2021

OTHER PUBLICATIONS

Intel Corporation; "Intel® 64 and IA-32 Architectures Software Developer's Manual, vol. 2A, Chapter 3, Instruction Set Reference, A-L, CPUID—CPU Identification"; pp. 811-856 (46 pages).
(Continued)

*Primary Examiner* — Xuxing Chen
(74) *Attorney, Agent, or Firm* — Sage Patent Group

(57) ABSTRACT
A method, performed by a first node. The method is for handling information indicating one or more features supported by a processor used by the first node. The first node operates in a computing system. The first node retrieves the information from the processor, before a hypervisor is loaded during a boot sequence. The first node determines a first digest of the information by using an algorithm supported by a hardware-based secure environment, associated to the processor. The first node extends predefined and reserved Platform Control Register (PCR) values at the hardware-based secure environment with the determined first digest. The first node thereby initiates indicating the one or more features supported by the processor to a second node operating in the computing system based on the determined first digest and the extended PCR.

8 Claims, 12 Drawing Sheets

(51) Int. Cl.
*G06F 21/57* (2013.01)
*G06F 21/64* (2013.01)

(58) Field of Classification Search
CPC ... H04L 9/0897; H04L 9/3247; H04L 9/3263; H04L 9/3297
See application file for complete search history.

(56) References Cited

U.S. PATENT DOCUMENTS

| | | | | |
|---|---|---|---|---|
| 2008/0244569 | A1* | 10/2008 | Challener | G06F 9/45558 |
| | | | | 718/1 |
| 2011/0035754 | A1* | 2/2011 | Srinivasan | G06F 9/5077 |
| | | | | 718/105 |
| 2016/0350534 | A1 | 12/2016 | Poornachandran et al. | |
| 2017/0308706 | A1* | 10/2017 | Ray | H04L 63/1441 |
| 2020/0099536 | A1 | 3/2020 | Block et al. | |
| 2020/0127850 | A1 | 4/2020 | Scarlata et al. | |
| 2021/0194912 | A1* | 6/2021 | Ward | G06F 21/74 |
| 2023/0036017 | A1* | 2/2023 | Lu | G06F 12/0851 |
| 2023/0058965 | A1* | 2/2023 | Best | H04L 9/3247 |
| 2025/0307435 | A1* | 10/2025 | Murthy | G06F 21/57 |

OTHER PUBLICATIONS

Takehisa et al.; "AES Flow Interception: Key Snooping Method on Virtual Machine.—Exception Handling Attack for AES-NI"; IACR Cryptology ePrint Archive 2011; 9 pages.

Advanced Micro Devices, Inc.; "AMD SEV-SNP: Strengthening VM Isolation with Integrity Protection and More"; Jan. 2020; 20 pages.

Mechalas, John P.; Trusted CPU Feature Detection Library for Intel® Software Guard Extensions (Intel® SGX); Apr. 9, 2019; 4 pages.

Trusted Computing Group; "TPM 2.0 Library"; https://trustedcomputinggroup.org/resource/tpm-library-specification; Mar. 2024; 11 pages.

International Search Report and Written Opinion mailed Jun. 15, 2022 for International Application No. PCT/SE2021/050986, 11 pages.

Intel; "Intel Trust Domain Extensions"; Intel White Paper; Aug. 1, 2020; XP055771915, 9 pages.

Liang, Hongliang et al.; "Establishing Trusted I/O Paths for SGX Client Systems With Aurora"; IEEE Transactions on Information Forensics and Security, vol. 15, 2020; XP011766610; pp. 1589-1600 (12 pages).

Schellekens; Dries et al.; "Remote Attestation on Legacy Operating Systems With Trusted Platform Modules"; Electronic Notes in Theoretical Computer Science, vol. 197, No. 1; Feb. 20, 2008; XP022490143; pp. 59-72 (14 pages).

Extended European Search Report mailed May 27, 2025 for European Patent Application No. 21960044.2, 10 pages.

* cited by examiner a)

b)

a)

a)

b)

a)

b)

FIRST NODE, SECOND NODE, THIRD NODE, COMPUTING SYSTEM AND METHODS PERFORMED THEREBY FOR HANDLING INFORMATION INDICATING ONE OR MORE FEATURES SUPPORTED BY A PROCESSOR

CROSS-REFERENCE TO RELATED APPLICATIONS

This application is a 35 U.S.C. § 371 national stage application for International Application No. PCT/SE2021/050986, entitled "FIRST NODE, SECOND NODE, THIRD NODE, COMPUTING SYSTEM AND METHODS PERFORMED THEREBY FOR HANDLING INFORMATION INDICATING ONE OR MORE FEATURES SUPPORTED BY A PROCESSOR", filed on Oct. 7, 2021, the disclosures and contents of which are hereby incorporated by reference in their entireties.

TECHNICAL FIELD

The present disclosure relates generally to a first node and methods performed thereby for handling information indicating one or more features supported by a processor used by the first node. The present disclosure also relates generally to a second node, and methods performed thereby for handling information indicating one or more features supported by a processor used by the second node. The present disclosure also relates generally to a third node, and methods performed thereby for handling information indicating one or more features supported by a processor used by the third node. The present disclosure further relates generally to a computing system, and methods performed thereby for handling information indicating the one or more features supported by the processor comprised in the computing system.

BACKGROUND

Computer systems in a communications network may comprise one or more nodes, which may also be referred to simply as nodes. A node may comprise one or more processors which, together with computer program code may perform different functions and actions, a memory, a receiving and a sending port.

A Central Processing Unit (CPU) Identification (CPUID) instruction may be understood to allow retrieving information about a processor, also known as processor identification information, such as vendor, model, serial number and supported features. As a result of executing the CPUID instruction, an Accumulator Register (AX), an Extended Base Register (EBX), an Extended Counter Register (ECX), and an Extended Data Register (EDX) may return the relevant CPUID information.

The information that may be returned by the CPUID instruction may include, but may not be limited to the security features such as the availability of Advanced Encryption Standard New Instructions (AES-NI), RDREAD, Control Flow Enforcement (CET), Indirect Branch Predictor Barrier (IBRS), Memory Protection Extension (MPX), Protection Keys for User mode (PKU), Protection Keys for Supervisor mode (PKS), Software Guard Extensions (SGX), Supervisor Mode Access Prevention (SMAP), Supervisor Mode Execution Prevention (SMEP), Single Thread Indirect Branch Predictors (STIBP) and User Mode Instruction Prevention (UMIP).

There are established guidelines and materials on the use of the CPUID instruction such as Intel 64 and IA-32 Architectures Software Developer Manuals [1].

An application may call the CPUID instruction to detect CPU features when deciding code paths to execute. For example, the application may decide to utilize processor features, such as AES-NI instructions to perform hardware-accelerated cryptographic operations if the CPUID information indicates that AES-NI instructions are available. The application may also include code paths which may not rely on the availability of AES-NI instructions and fall back to implementations of cryptographic algorithms. Such code paths may typically be less efficient compared to hardware-accelerated alternatives, or have undesirable security properties, such as relying on weaker cryptographic algorithms or exhibit weaknesses against cache timing side-channels attacks. However, the application may decide to run such less efficacious code paths in cases where the CPUID instruction indicates that the desired processor feature is unavailable.

SUMMARY

As part of the development of embodiments herein, a number of problems with exiting methods will first be identified and discussed.

In the x86 architecture, the CPUID instruction may be understood to allow retrieving information about the processor such as supported features, and other processor details as described in the Background section.

The information retrieved by the CPUID instruction may be falsified by software that may intercept the information before it may reach the application. This is commonly referred to as "CPUID spoofing". For example, the CPUID instruction may be trapped and emulated by a hypervisor. The hypervisor may arbitrarily manipulate the information returned by the emulated CPUID instruction to the application running within a Virtual Machine (VM). A malicious hypervisor may, for example, manipulate the CPUID information on a processor implementing feature to indicate the feature is not supported. This may lead to situations where application or kernel mode software running within the VM may be manipulated into choosing a less efficacious code path which may reduce the security posture of the software. As another example, a malicious hypervisor may manipulate the CPUID information on a non-compatible processor to indicate a feature is supported. This may lead to situations where the software within the VM may be manipulated into choosing a code path with unsupported instructions. This may lead to the processor issuing invalid opcode exceptions (#UD), which may be leveraged as a denial of service attack, or in the case of AES-NI, as a means for a malicious hypervisor to estimate the location of the encryption key in processor registers or in memory [2]. As yet a further example, a malicious hypervisor may manipulate the CPUID information to misrepresent numerical properties retrieved by the software using CPUID. This may lead to situations where VMs may take incorrect actions in response to CPUID information. For example, a malicious hypervisor may tamper with the size of the x86 extended save area reported by CPUID which indicate the amount of memory required by XSAVE/XRSTOR CPU instructions. If the VM allocates an insufficient buffer for the extended save area in response to incorrect CPUID information, the XSAVE instruction may cause a buffer overflow, which may potentially lead to security issues within the VM [3].

Another example of CPUID spoofing may occur in Intel Software Guard Extension (SGX) Enclaves. Enclaves may be understood as hardware-isolated trusted compartments within an application that may provide a trusted runtime environment that may exclude both the surrounding application, Operating System (OS), and any hypervisor from their Trusted Computing Base (TCB). The CPUID instruction cannot be executed inside an enclave. To query processor information, helper functions in the Intel SGX software development kit may need to make calls into untrusted code outside the enclave in order to retrieve processor identification information. However, as the CPUID instruction may be understood to be executed outside the enclave, the results may be manipulated by a malicious OS or host application. Enclaves that may depend on the processor identification information may be manipulated by malicious software into choosing either less efficacious code paths or code paths with unsupported instructions. While #UD exceptions within enclaves cannot be intercepted by a malicious hypervisor, they may still be leveraged as a means to deny service to the enclave user.

The Trusted CPU Feature Detection Library for Intel SGX API [4] may allow enclaves to detect some CPU features without exiting the trusted runtime environment of the enclave. The Application Programming Interface (API) may detect CPU features within an enclave by probing whether instructions unique to a feature result in processor exceptions. However, the Trusted CPU Feature Detection API may not completely replace the CPUID functionality but may be required to typically be combined with untrusted processor identification informed originating from an untrusted trust domain.

It is an object of embodiments herein to improve the handling of information indicating one or more features supported by a processor comprised in a node.

According to a first aspect of embodiments herein, the object is achieved by a method performed by a first node. The method is for handling information indicating one or more features supported by a processor used by the first node. The first node operates in a computing system. The first node retrieves the information from the processor, before a hypervisor is loaded during a boot sequence. The first node determines a first digest of the information by using an algorithm supported by a hardware-based secure environment, associated to the processor. The first node then extends predefined and reserved Platform Control Register (PCR) values at the hardware-based secure environment with the determined first digest. The first node thereby initiates indicating the one or more features supported by the processor to a second node operating in the computing system based on the determined first digest and the extended PCR.

According to a second aspect of embodiments herein, the object is achieved by a method performed by a third node. The method is for handling the information indicating the one or more features supported by the processor used by the third node. The third node operates in the computing system. The third node establishes an authenticated and integrity protected channel to the hardware-based secure environment, associated to the processor. The third node then retrieves the predefined and reserved PCR values from the hardware-based secure environment. The PCR values comprise the first digest of information from the processor. The third node also retrieves the information from the processor. The third node then generates a second digest of the retrieved information. The third node also validates that the second digest of the retrieved information matches the values stored in the PCR. The third node thereby initiates indicating the information to the second node operating in the computing system based on the validated digest, e.g., by generating a first attestation quote comprising the information.

According to a third aspect of embodiments herein, the object is achieved by a method performed by a second node. The method is for handling the information indicating the one or more features supported by the processor used by the second node. The second node operates in the computing system. The second node fetches, from a storage, the first attestation quote. The first attestation quote comprises the information, one of a first monotonic count and a first time stamp from a trusted source, and a Provisioning Certification Key (PCK) certificate. The second node obtains one of a second monotonic count or a second time stamp from the trusted source. The second node validates the fetched first attestation quote by, first, generating a second attestation quote. Second, determining whether or not the PCK certificate is valid, and a signature in the fetched first attestation quote is validated against the PCK Certificate. Third, determining whether or not at least one of: a) the first monotonic count equals the second monotonic count, and b) a difference between the second time stamp and the first time stamp is within a threshold. The second node then extracts the information from the fetched first attestation quote with the proviso that the fetched first attestation quote is validated. The second node then initiates providing a virtual machine service based on the extracted information.

According to a fourth aspect of embodiments herein, the object is achieved by a method performed by a computing system. The method is for handling the information indicating the one or more features supported by the processor comprised in the computing system. The computing system comprises the first node, the second node and the third node. The method comprises retrieving, by the first node, the information from the processor, before the hypervisor is loaded during the boot sequence. The method comprises determining, by the first node, the first digest of the information by using the algorithm supported by the hardware-based secure environment, associated to the processor. The method comprises extending, by the first node, the predefined and reserved PCR values at the hardware-based secure environment with the determined first digest. The first node thereby initiates indicating the one or more features supported by the processor to the second node operating in the computing system based on the determined first digest and the extended PCR. The method also comprises retrieving, by the third node, the predefined and reserved PCR values from the hardware-based secure environment. The method comprises validating, by the third node, that the second digest of the information matches the values stored in the PCR. The method comprises thereby initiating, by the third node, indicating the information to the second node based on the validated digest. The method further comprises initiating, by the second node, providing the virtual machine service based on the indicated information.

According to a fifth aspect of embodiments herein, the object is achieved by the first node. The first node is for handling the information configured to indicate the one or more features configured to be supported by the processor configured to be used by the first node. The first node is configured to operate in the computing system. The first node is configured to retrieve the information from the processor, before the hypervisor is configured to be loaded during the boot sequence. The first node is further configured to determine the first digest of the information by using the algorithm configured to be supported by the hardware-based secure environment, configured to be associated to the processor. The first node is also configured to extend the predefined and reserved PCR values at the hardware-based secure environment with the first digest configured to be determined. The first node is thereby configured to initiate indicating the one or more features configured to be supported by the processor to the second node configured to operate in the computing system, based on the first digest configured to be determined and the PCR configured to be extended.

According to a sixth aspect of embodiments herein, the object is achieved by the third node, for handling the information configured to indicate the one or more features configured to be supported by the processor configured to be used by the third node. The third node is configured to operate in the computing system. The third node is also configured to establish the authenticated and integrity protected channel to the hardware-based secure environment, configured to be associated to the processor. The third node is further configured to retrieve the predefined and reserved PCR values from the hardware-based secure environment. The PCR values are configured to comprise the first digest of information from the processor. The third node is also configured to retrieve the information from the processor. The third node is also configured to generate the second digest of the information configured to be retrieved. The third node is additionally configured to validate that the second digest of the information configured to be retrieved matches the values stored in the PCR. The third node is thereby configured to initiate indicating the information to the second node configured to operate in the computing system based on the digest configured to be validated.

According to a seventh aspect of embodiments herein, the object is achieved by the second node, for handling the information configured to indicate the one or more features configured to be supported by the processor configured to be used by the second node. The third node is configured to operate in the computing system. The second node is configured to fetch, from the storage, the first attestation quote. The first attestation quote is configured to comprise the information, the one of the first monotonic count and the first time stamp from the trusted source, and the PCK certificate. The second node is further configured to obtain the one of the second monotonic count or the second time stamp from the trusted source. The second node is further configured to validate the first attestation quote configured to be fetched by, first, generating the second attestation quote. Second, determining whether or not the PCK certificate is valid, and the signature in the fetched first attestation quote is validated against the PCK Certificate. Third, determining whether or not at least one of: a) the first monotonic count equals the second monotonic count, and b) the difference between the second time stamp and the first time stamp is within the threshold. The second node is also configured to extract the information from the first attestation quote configured to be fetched with the proviso that the first attestation quote configured to be fetched is validated. The second node is additionally configured to initiate providing the virtual machine service based on the information configured to be extracted.

According to an eighth aspect of embodiments herein, the object is achieved by the computing system, for handling the information configured to indicate the one or more features configured to be supported by the processor configured to be comprised in the computing system. The computing system is configured to comprise the first node, the second node and the third node. The computing system is configured to retrieve, by the first node, the information from the processor, before the hypervisor is configured to be loaded during the boot sequence. The computing system is also configured to determine, by the first node, the first digest of the information by using the algorithm configured to be supported by the hardware-based secure environment, configured to be associated to the processor. The computing system is further configured to extend, by the first node, the predefined and reserved PCR values at the hardware-based secure environment with the first digest configured to be determined. The first node is thereby configured to initiate indicating the one or more features configured to be supported by the processor to the second node configured to operate in the computing system, based on the first digest configured to be determined and the PCR configured to be extended. The computing system is further configured to retrieve, by the third node, the predefined and reserved PCR values from the hardware-based secure environment. The computing system is additionally configured to validate, by the third node, that the second digest of the information matches the values stored in the PCR. The third node is thereby configured to initiate indicating the information to the second node based on the digest configured to be validated. The computing system is further configured to initiate, by the second node, providing the virtual machine service based on the information configured to be indicated.

According to a ninth aspect of embodiments herein, the object is achieved by a computer program, comprising instructions which, when executed on at least one processor, cause the at least one processor to carry out the method performed by the first node.

According to a tenth aspect of embodiments herein, the object is achieved by a computer-readable storage medium, having stored thereon the computer program, comprising instructions which, when executed on at least one processor, cause the at least one processor to carry out the method performed by the first node.

According to an eleventh aspect of embodiments herein, the object is achieved by a computer program, comprising instructions which, when executed on at least one processor, cause the at least one processor to carry out the method performed by the second node.

According to a thirteenth aspect of embodiments herein, the object is achieved by a computer-readable storage medium, having stored thereon the computer program, comprising instructions which, when executed on at least one processor, cause the at least one processor to carry out the method performed by the second node.

According to a fourteenth aspect of embodiments herein, the object is achieved by a computer program, comprising instructions which, when executed on at least one processor, cause the at least one processor to carry out the method performed by the third node.

According to a fifteenth aspect of embodiments herein, the object is achieved by a computer-readable storage medium, having stored thereon the computer program, comprising instructions which, when executed on at least one processor, cause the at least one processor to carry out the method performed by the third node.

According to a sixteenth aspect of embodiments herein, the object is achieved by a computer program, comprising instructions which, when executed on at least one processor, cause the at least one processor to carry out the method performed by the computing system.

According to a seventeenth aspect of embodiments herein, the object is achieved by a computer-readable storage medium, having stored thereon the computer program, comprising instructions which, when executed on at least one processor, cause the at least one processor to carry out the method performed by the computing system.

Embodiments herein may be understood to enable retrieval of the information, e.g., CPUID, information by the second node, or other nodes similar to the second node, e.g., Workload Enclaves (WEs), in a trusted way despite malicious hypervisor/host OS.

By retrieving the information from the processor before the hypervisor is loaded during the boot sequence, the first node may obtain the information before it may be intercepted by a malicious hypervisor.

By determining the first digest of the information by using the algorithm supported by the hardware-based secure environment, the first node may ensure that the information is reduced to a size that may be ultimately stored in the hardware-based secure environment, and thereby prevent it from being tampered with by e.g., a malicious hypervisor.

By extending the predefined and reserved PCR values, the first node may be enabled to store the determined first digest in a way tampering, in case of occurrence, may become evident.

By retrieving the predefined and reserved PCR values from the hardware-based secure environment, generating second digest of the retrieved information from the processor, and validating that the second digest of the retrieved information matches the values stored in the PCR, the third node may be able to retrieve a copy that may be trusted, of the information indicating the one or more features of the processor and may then be enabled to attest it as being a true copy. This may enable the second node to then fetch the first attestation quote.

By the first attestation quote comprising the information, the one of a first monotonic count and the first time stamp from the trusted source, and the PCK certificate, the second node is enabled to validate the fetched first attestation quote as being authentic and not outdated. The second node may then be enabled to extract the information from the fetched first attestation quote and initiate providing the virtual machine service based on the extracted information.

By initiating providing the virtual machine service based on the extracted information, the second node may ensure that the correct, that is, untampered by a malicious party, information indicating the one or more features supported by the processor may be used. Therefore, the virtual machine service may be performed in accordance with the one or more features supported by a processor. Hence, efficacious code paths or code paths with supported instructions may be chosen to increase the security posture of the software. Also, proper buffer may be allocated, avoiding a buffer overflow. Hence, the virtual machine service may be provided more securely.

BRIEF DESCRIPTION OF THE DRAWINGS

Examples of embodiments herein are described in more detail with reference to the accompanying drawings, according to the following description.

DETAILED DESCRIPTION

Several embodiments are comprised herein, which address these problems of the existing methods. Embodiments herein may be understood to relate to trusted CPUID retrieval in a virtualized environment. Particularly, embodiments herein may be understood to relate to methods and apparatuses allowing retrieval of the CPUID information during the early stages of the boot sequence, before hypervisor and host OS may be loaded, and providing this "trusted CPUID" information as evidence by means of cryptographic protections to VMs and secure enclaves.

The embodiments will now be described more fully hereinafter with reference to the accompanying drawings, in which examples are shown. In this section, embodiments herein are illustrated by exemplary embodiments. It should be noted that these embodiments are not mutually exclusive. Components from one embodiment or example may be tacitly assumed to be present in another embodiment or example and it will be obvious to a person skilled in the art how those components may be used in the other exemplary embodiments.

Although terminology from the Intel 64-bit x86 processor architecture [1] and the TCG Trusted Platform Module specifications [2] may be used in this disclosure to exemplify the embodiments herein, this should not be seen as limiting the scope of the embodiments herein to only the aforementioned system. Other systems supporting similar or equivalent functionality may also benefit from exploiting the ideas covered within this disclosure. In future computing systems, the terms used herein may need to be reinterpreted in view of possible terminology changes in future technologies.

Figure 1:
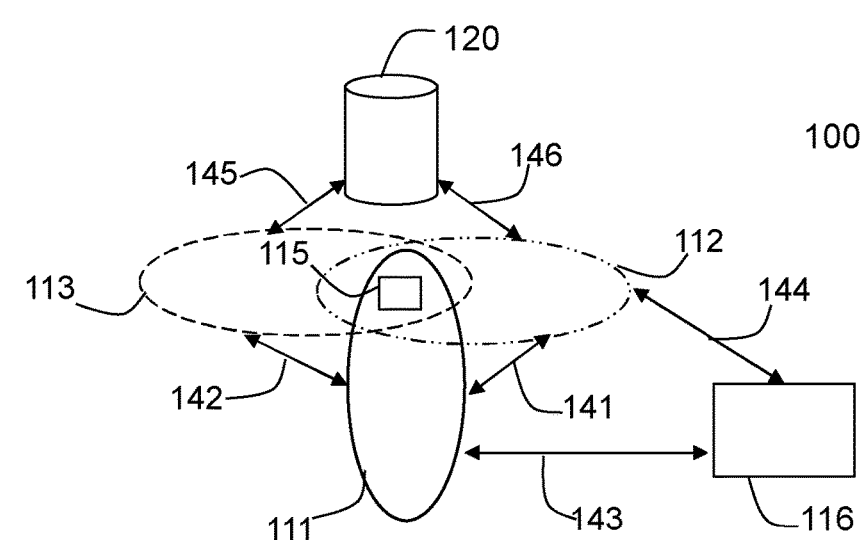
FIG. 1 is a schematic diagram illustrating a non-limiting example of a computing system, according to embodiments herein.
Figure 1:
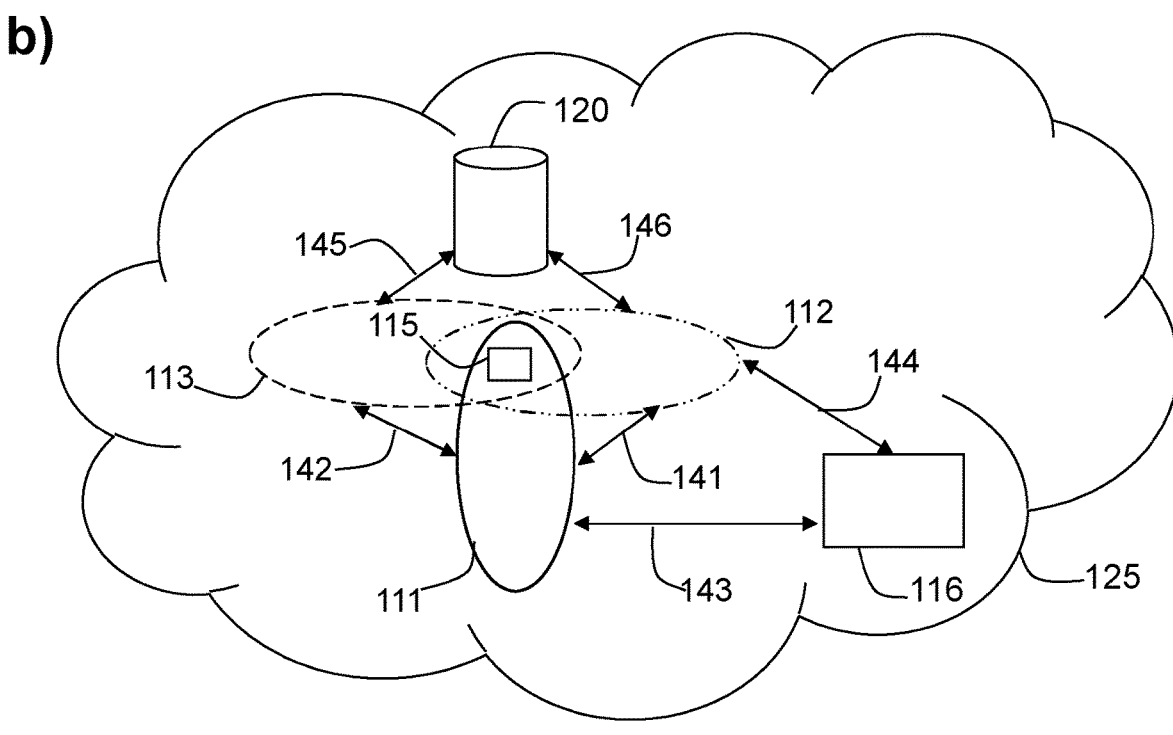

FIG. 1 is a schematic diagram depicting a non-limiting example of a computing system 100, in which embodiments herein may be implemented. The computing system 100 comprises a plurality of nodes, whereof a first node 111, a second node 112 and a third node 113 are depicted in FIG. 1. The computing system 100 also comprises a processor 115. Any of the first node 111, the second node 112 and the third node 113 may be understood as a computer system configured to have the processor 115 execute a number of instructions. In typical embodiments, the first node 111, the second node 112 and the third node 113 may execute its respective instructions on the processor 115. Any of the first node 111, the second node 112 and the third node 113, taken individually, may be understood to refer to a first computer system, a second computer system and a third computer system, respectively comprising the processor 115, configured to execute the actions described as being respectively performed by these nodes. Hence, any of the first node 111, the second node 112 and the third node 113 may be understood as components of the computing system 100, which may be manufactured at different stages, e.g., any of the first node 111, the second node 112 and the third node 113 may be manufactured or assembled first, second or third. In other words, the first node 111 may be understood to refer to a first computer system comprising the processor 115 and configured to execute any of the actions described below as performed by the first node 111. The first node 111 may be, in some examples, a shim layer or a bootloader.

The second node 112 may be understood to refer to a second computer system comprising the processor 115 and configured to execute any of the actions described below as performed by the second node 112. The second node 112 may manage, in some examples, an SGX Enclave running in a guest VM.

The third node 113 may be understood to refer to a third computer system comprising the processor 115 and configured to execute any of the actions described below as performed by the third node 113. In typical embodiments, the first node 111, the second node 112 and the third node 113 may be all comprised in the computing system 100 and sharing the processor 115. The third node 113 may manage, in some examples, an SGX Enclave running in a Virtual machine (VM) host.

The computing system 100 further comprises a hardware-based secure environment 116. The hardware-based secure environment may be understood as an attestable Trusted Execution Environment (TEE) equipped with secure storage. In some examples, the hardware-based secure environment may be a Trusted Platform Module (TPM).

The computing system 100 also comprises a storage 120 that may be shared between a Virtual Machine Monitor (VMM) and guest VMs.

The computing system 100 may be implemented, as depicted in the non-limiting example of FIG. 1, as a stand-alone server in e.g., a host computer in the cloud 125. The computing system 100 may in some examples be a distributed node or distributed server, with some of its functions being implemented locally, e.g., by a client manager, and some of its functions implemented in the cloud 125, by e.g., a server manager. Yet in other examples, the computing system 100 may also be implemented as processing resources in a server farm.

The computing system 100 may be, e.g., a confidential compute node, or a computing system enabling similar functionality.

The first node 111 may be configured to communicate within the computing system 100 with the second node 112 over a first link 141. The first node 111 is configured to communicate within the computing system 100 with the third node 113 over a second link 142. The first node 111 may be configured to communicate in the computing system 100 with the hardware-based secure environment 116 over a third link 143. The second node 112 is similarly configured to communicate within the computing system 100 with the hardware-based secure environment 116 over a fourth link

144. The third node 113 is configured to communicate within the computing system 100 with the storage 120 over a fifth link 145. The second node 112 is configured to communicate within the computing system 100 with the storage 120 over a sixth link 146.

Any of the first link 141, the second link 142, the third link 143, the fourth link 144, the fifth link 145 and the sixth link 146 may be typically a wired link.

In general, the usage of "first", "second", "third", "fourth", "fifth" and/or "sixth" herein may be understood to be an arbitrary way to denote different elements or entities, and may be understood to not confer a cumulative or chronological character to the nouns they modify.

Figure 2:
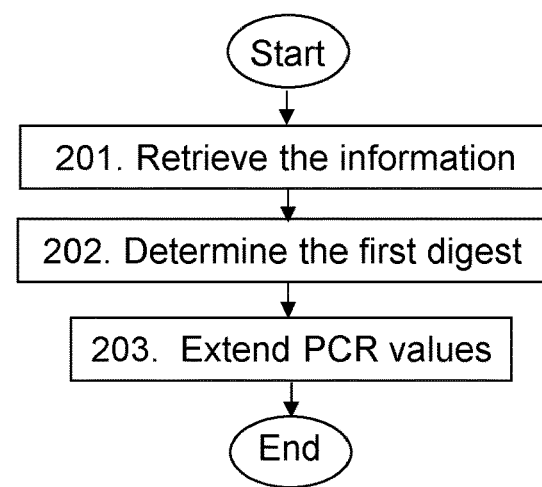
FIG. 2 is a flowchart depicting embodiments of a method in a first node, according to embodiments herein.

Embodiments of a method performed by the first node 111, will now be described with reference to the flowchart depicted in FIG. 2. The method may be understood to be for handling information indicating one or more features supported by a processor 115 used by the first node 111. The first node 111 operates in the computing system 100.

The first node 111 may manage a shim layer or a boot-loader.

The method may comprise the actions described below. Several embodiments are comprised herein. In some embodiments some of the actions may be performed. In some embodiments all the actions may be performed. One or more embodiments may be combined, where applicable. All possible combinations are not described to simplify the description. It should be noted that the examples herein are not mutually exclusive. Components from one example may be tacitly assumed to be present in another example and it will be obvious to a person skilled in the art how those components may be used in the other examples. In FIG. 2, optional actions are indicated with dashed boxes.
Action 201

In this Action 201, the first node 111 retrieves the information from the processor 115, before a hypervisor is loaded during a boot sequence. The hypervisor may be understood as a VMM that may run one or more guest Virtual Machines (VMs) on a VM host.

The information may be Central Processor Unit identification (CPUID) information.

By retrieving the information from the processor 115 before the hypervisor is loaded during the boot sequence in this Action 201, the first node 111 may obtain the information before it may be intercepted by a malicious hypervisor.
Action 202

In this Action 202, the first node 111 determines a first digest of the information by using an algorithm supported by a hardware-based secure environment 116, associated to the processor 115.

A digest may be understood, e.g., as an output of a one-way cryptographic hash algorithm that may map data of an arbitrary size to a fixed size. The first digest may be calculated, e.g., over the raw CPUID output Determining may be understood as e.g., calculating.

The hardware-based secure environment 116 may be a Trusted Platform Module (TPM).

The algorithm may be, e.g., one of the secure digest algorithms supported by the TPM, e.g., Secure Hash Algorithm 256 (SHA256).

By determining the first digest of the information by using the algorithm supported by the hardware-based secure environment 116 in this Action 202, the first node 111 may ensure that the information is reduced to a size that may be ultimately stored in the hardware-based secure environment 116, and thereby prevent it from being tampered with by e.g., a malicious hypervisor.

Action 203

The first node 111, in this Action 203, extends predefined and reserved Platform Control Register (PCR) values at the hardware-based secure environment 116 with the determined first digest. The first node 111 thereby initiates indicating the one or more features supported by the processor 115 to the second node 112 operating in the computing system 100, based on the determined first digest and the extended PCR.

To extend may be understood as to provide an update calculation of the PCR using a one-way cryptographic hash in a manner which may be understood to prevent the value that may include the determined first digest from being removed.

The PCR values may be understood as a state of a PCR at a given point in time. The PCR values may be, e.g., PCRx, and they may be extended with the first digest value of CPUID information.

By extending the predefined and reserved PCR values in this Action 203, the first node 111 may be enabled to store the determined first digest in a way tampering, in case of occurrence, may become evident.

Initiating may be understood as enabling, facilitating, triggering or making possible. By the first node 111 extends predefined and reserved Platform Control Register (PCR) values at the hardware-based secure environment 116 with the determined first digest, the first node 111 may enable that ultimately, the second node 112 may obtain the indication of the one or more features supported by the processor 115 in a manner that the indication of the one or more features may be trusted, that is, that if tampering occurs, it may be detected.

Figure 3:
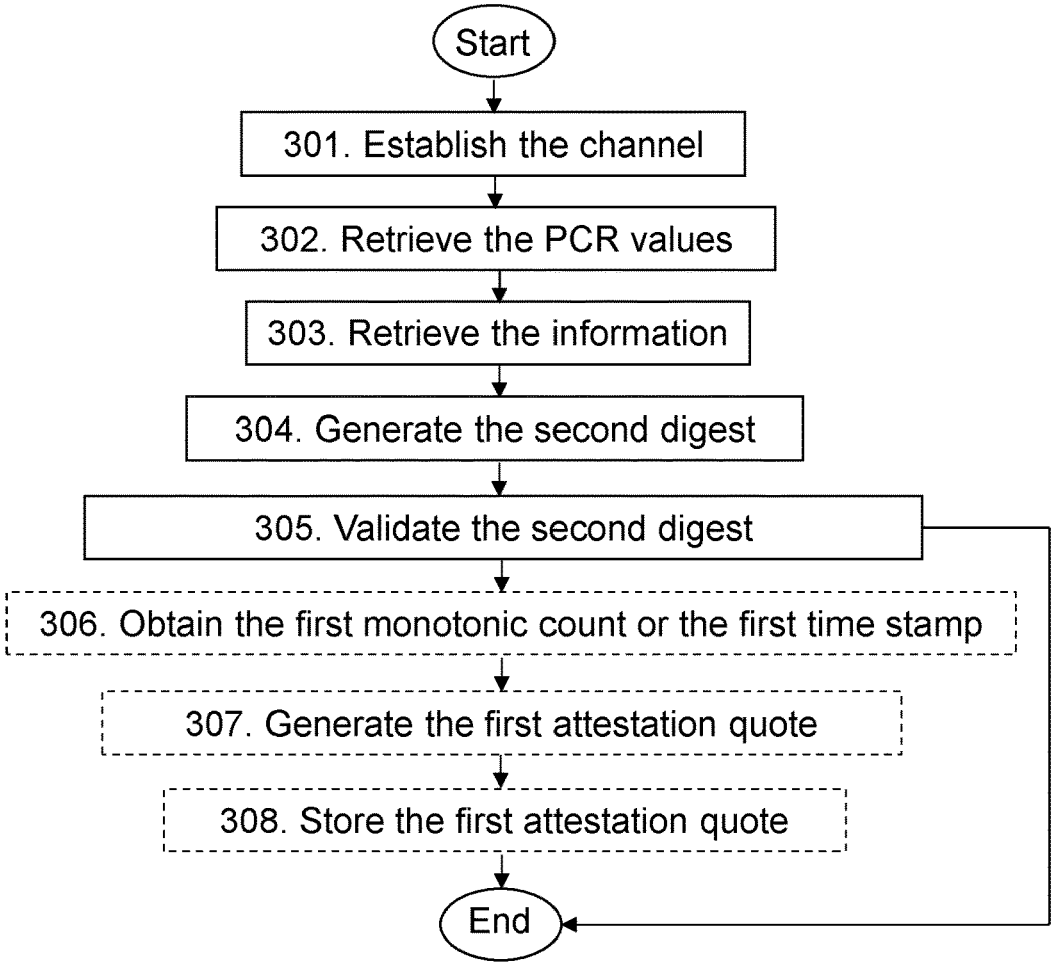
FIG. 3 is a flowchart depicting embodiments of a method in a third node, according to embodiments herein.

Embodiments of a method performed by the third node 113, will now be described with reference to the flowchart depicted in FIG. 3. The method is for handling information indicating the one or more features supported by the processor 115 used by the third node 113. The third node 113 operates in the computing system 100.

In some embodiments, the third node 113 may manage a Software Guard Extensions (SGX) Enclave that may run in a VM host. For example, the third node 113 may manage an SGX Enclave that may act as a virtual machine Platform Verification Enclave (PVE).

The method may comprise one or more of the following actions. Several embodiments are comprised herein. In some embodiments all the actions may be performed. One or more embodiments may be combined, where applicable. All possible combinations are not described to simplify the description. It should be noted that the examples herein are not mutually exclusive. Components from one example may be tacitly assumed to be present in another example and it will be obvious to a person skilled in the art how those components may be used in the other examples. In FIG. 3, optional actions are indicated with dashed boxes.

The detailed description of some of the following corresponds to the same references provided above, in relation to the actions described for the first node 111, and will thus not be repeated here to simplify the description. For example, the information may be CPUID information.

Action 301

When VMs may be launched by a Virtual Machine Monitor (VMM), the hardware-based secure environment 116, e.g., a physical TPM, may be assigned to the third node 113, e.g., the hardware-based secure environment 116 may be assigned to a VM host in which the third node 113 may run.

The third node 113, in this Action 301, establishes an authenticated and integrity protected channel to the hardware-based secure environment 116, associated to the processor 115.

The hardware-based secure environment 116 may be a TPM.

An authenticated and integrity protected channel may be understood as an encrypted communication channel that may use secure cryptography where the connection initiator, here, the third node 113, may have authenticated the recipient, here, the hardware-based secure environment 116. The establishing in this Action 301 may be performed as described in the TPM 2.0 Specifications [5].

The third node 113 may establish the authenticated channel to the hardware-based secure environment 116, e.g., the physical TPM, by also including an Endorsement Key (EK) certificate.

An advantage provided by this Action 301 is that the third node 113 may be able to retrieve an authentic copy of the digest.

Action 302

In this Action 302, the third node 113 retrieves the predefined and reserved PCR values, e.g., the PCRx value that may hold the measurement of the CPUID information, from the hardware-based secure environment 116. The PCR values comprise the first digest of information from the processor 115.

The retrieving in this Action 302 may be performed after the hypervisor has been loaded during the boot sequence.

Action 303

In this Action 303, the third node 113 retrieves the information from the processor 115.

The retrieving in this Action 303 may be performed after the hypervisor is loaded during the boot sequence.

Action 304

In this Action 304, the third node 113 generates a second digest of the retrieved information.

This Action 304 may be performed in order to be able to validate the information from the processor 115, in the next Action 304.

Action 305

Since the information from the processor 115 may have been retrieved in Action 303 after the hypervisor may have been loaded, there may be a possibility that this information may have been tampered with by the hypervisor. Retrieving the original information from the retrieved PCR value, digest, may be understood to not be feasible due to the properties of the one-way cryptographic hash algorithm that may have been used to generate the digest in Action 202.

According to the foregoing, the third node 113, in this Action 305, validates that the second digest of the retrieved information matches the values stored in the PCR, e.g., that is, the first digest comprised the PCRx. The third node 113 thereby initiates indicating the information, e.g., the one or more features supported by the processor 115, to the second node 112 operating in the computing system 100 based on the validated digest.

The validating in this Action 305 may be performed by comparing the first digest of the information from the processor 115 with the second digest of the of the retrieved information.

Initiating may be understood as enabling, facilitating, triggering or making possible. By the third node 113 validating the second digest of the retrieved information, the first node 111 may enable that ultimately, the second node 112 may obtain the indication of the one or more features supported by the processor 115 in a manner that the indication of the one or more features may be trusted, that is, that if tampering occurs, it may be detected.

Action 306

In this Action 306, the third node 113, may obtain one of an incremented monotonic count as a first count or a first time stamp from a trusted source.

The trusted source may be understood as an authenticated entity. For example, the trusted source may be an SGX Platform Service in embodiments where the third node 113 may manage an SGX Enclave.

For example, the third node 113, e.g., an SGX running in a VM host, may retrieve a monotonic count from the trusted source, or time information, such as year, month, day, minute, second.

This Action 306 may be understood to be performed in order to mitigate rollback attacks, as will be explained later.

Action 307

The third node 113, in this Action 307, may generate a first attestation quote comprising the information and the obtained one of the first monotonic count and the first time stamp from the trusted source. The obtained one of the first monotonic count and the first time stamp may be included in the first attestation quote in order to prevent rollback attacks, that is, that an older, no longer applicable quote may be attempted to be provided by a malicious party.

An attestation quote may be understood as a proof of trustworthiness of the third node 113. For example, the attestation quote may be an SGX Data Center Attestation Primitives (DCAP) attestation quote in embodiments where the third node 113 may manage an SGX Enclave.

The third node 113 may generate the first attestation quote by first, generating data that may include the trusted first time stamp and the information, e.g., the CPUID information. Then, the third node 113 may generate the first attestation quote, e.g., Intel SGX Data Center Attestation Primitives (DCAP) attestation quote, by placing the generated data mentioned in the previous sentence into a user data field of the first attestation quote.

The initiating indicating the information, e.g., the one or more features supported by the processor 115, to the second node 112 may be further based on the generated first attestation quote in Action 307.

Action 308

The third node 113, in this Action 308, may store, in the storage 120, the generated first attestation quote.

The first attestation quote may be stored in a location where it may be discovered and fetched by the second node 112, e.g., other VMs. Accordingly, the initiating indicating the information, e.g., the one or more features supported by the processor 115, to the second node 112 may be further based on the stored first attestation quote in Action 307.

Figure 4:
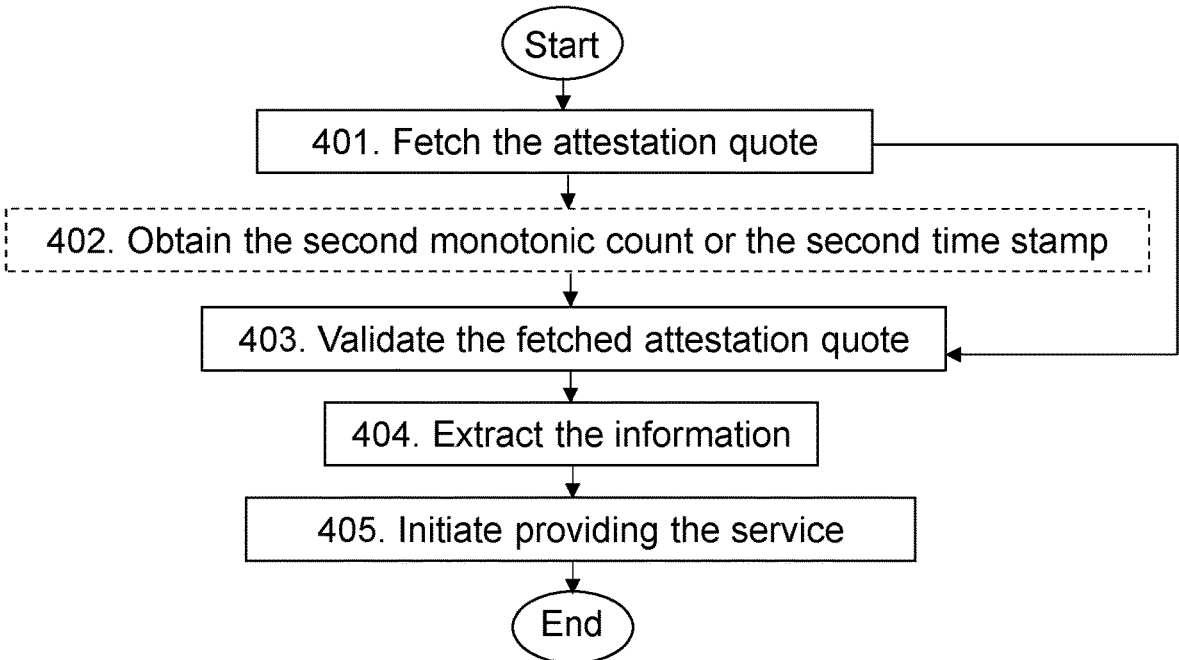
FIG. 4 is a flowchart depicting embodiments of a method in a second node, according to embodiments herein.

Embodiments of a method performed by the second node 112, will now be described with reference to the flowchart depicted in FIG. 4. The method is for handling the information indicating the one or more features supported by the processor 115 used by the second node 112. The second node 112 operates in the computing system 100.

The second node 112 may manage a Workload Enclave (WE) run in a VM. Accordingly, the second node 112 may manage an SGX Enclave, e.g., running on a guest VM, that may be tasked to process a workload.

The method may comprise one or more of the following actions. Several embodiments are comprised herein. In some embodiments all the actions may be performed. One or more embodiments may be combined, where applicable. All possible combinations are not described to simplify the description. It should be noted that the examples herein are not mutually exclusive. Components from one example may be tacitly assumed to be present in another example and it will be obvious to a person skilled in the art how those components may be used in the other examples. In FIG. 4, optional actions are indicated with dashed boxes.

The detailed description of some of the following corresponds to the same references provided above, in relation to the actions described for the first node 111, and will thus not be repeated here to simplify the description. For example, the information may be CPUID information.

Action 401

The second node 112, in this Action 401, fetches, from the storage 120, the first attestation quote comprising the information, one of the first monotonic count and the first time stamp from the trusted source, and a Provisioning Certification Key (PCK) certificate.

Action 402

In this Action 402, the second node 112 obtains one of a second monotonic count and a second time stamp from the trusted source.

Action 403

In this Action 403, the second node 112 validates the fetched first attestation quote by: i) generating a second attestation quote, ii) determining whether or not the PCK certificate is valid, and a signature in the fetched first attestation quote is validated against the PCK Certificate, and iii) determining whether or not at least one of: a) the first monotonic count equals the second monotonic count, and b) a difference between the second time stamp and the first time stamp is within a threshold. That is, that the first time stamp is not too old, over the threshold, and therefore potentially outdated.

In other words, the validation process in this Action 403 may comprise the following:

a. Validation of certificate chain including PCK certificate as well as the intermediate and the root certificates;
   b. Validation of attestation quote signature, and
   c. Validation of attestation quote data including but not limited to MRSIGNER and MRENCLAVE.

The second node 112 may generate its own attestation quote and may make sure that the PCK certificate matches with the one in the first attestation quote provided by the third node 113. This is to ensure that the third node 113 and the second node 112 may run on the same machine. The second node 112 may also validate the timestamp/monotonic counter value to ensure the freshness of the information, e.g., CPUID information.

By validating the fetched first attestation quote, the second node 112 may ensure that it originates from an authentic third node 113, e.g., an authentic SGX running on a VM host, e.g., an authentic PVE.

Action 404

In this Action 404, the second node 112 may extract the information from the fetched first attestation quote with the proviso that the information is validated. In other words, upon successful attestation validation, the second node 112 may extract the CPUID information from the first attestation quote and use it.

The sequence of Actions 401-404 may be understood to allow retrieval of the information, e.g., CPUID, information by the second node 112, or other nodes similar to the second node 112, e.g., other Workload Enclaves (WEs), in a trusted way despite malicious hypervisor/host OS. WEs may be run in each VM.

Action 405

The second node 112, in this Action 405, initiates providing a virtual machine service based on the extracted information.

Initiating may be understood as triggering, starting, or enabling or facilitating another node to start or trigger.

The VM service may be for example, encryption of data within the VM using the AES block cipher. Such as service may use AES-NI instructions if those may be supported by the underlying processor, that is, the processor 115.

By initiating providing the virtual machine service based on the extracted information, the second node 112 may ensure that the correct, that is, untampered by a malicious party, information indicating the one or more features supported by the processor 115 may be used, and that therefore, the virtual machine service may be performed in accordance with the one or more features supported by a processor 115. Hence, efficacious code paths or code paths with supported instructions may be chosen to increase the security posture of the software. Also, proper buffer may be allocated, avoiding a buffer overflow. Hence, the virtual machine service may be provided more securely.

Figure 5:
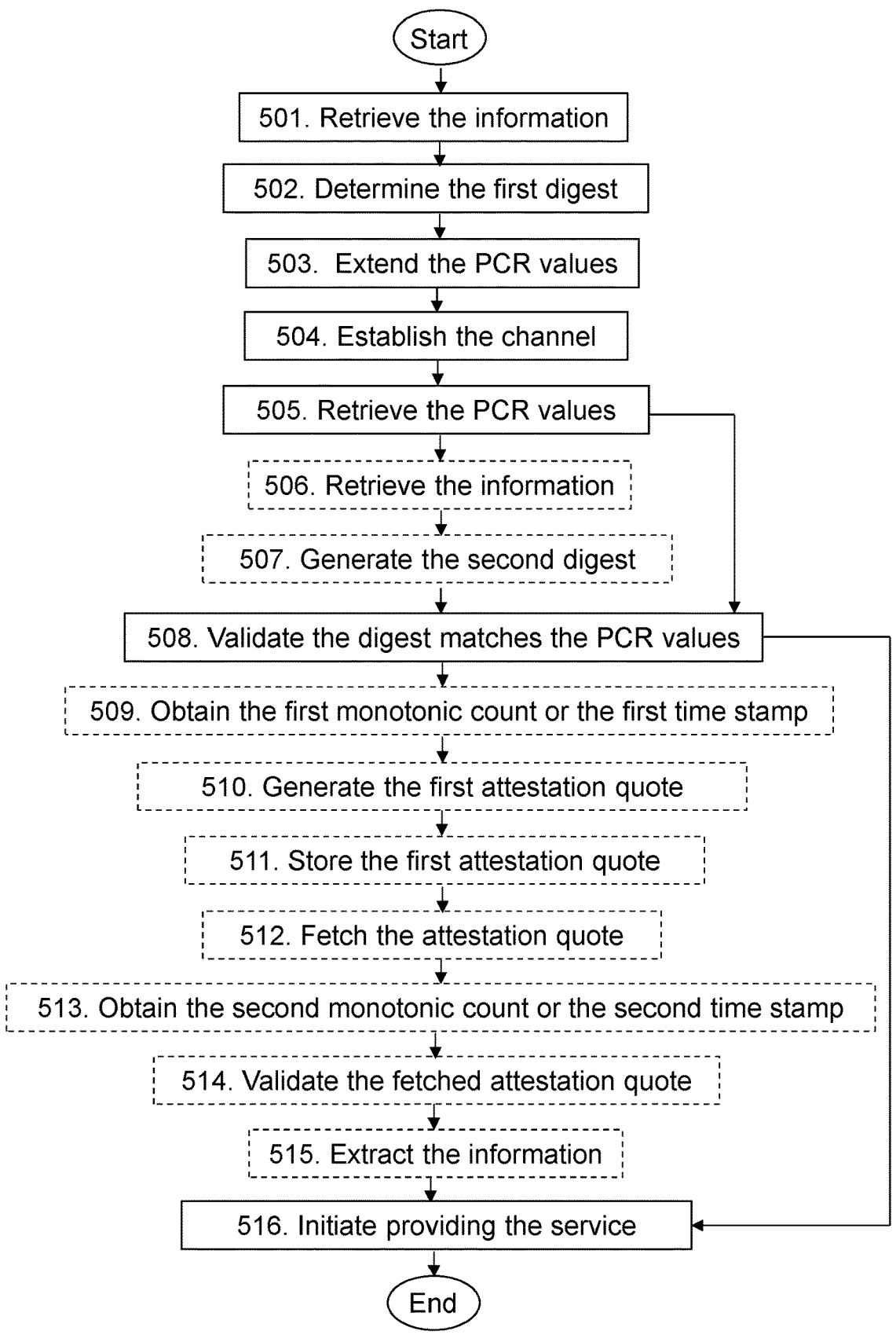
FIG. 5 is a flowchart depicting embodiments of a method in a computing system, according to embodiments herein.

Embodiments of a method performed by the computing system 100, will now be described with reference to the flowchart depicted in FIG. 5. The method may be understood to be for handling the information indicating the one or more features supported by the processor 115 comprised in the computing system 100. The computing system 100 comprises the first node 111, the second node 112 and the third node 113.

The method may comprise the actions described below. Several embodiments are comprised herein. In some embodiments some of the actions may be performed. In some embodiments all the actions may be performed. One or more embodiments may be combined, where applicable. All possible combinations are not described to simplify the description. It should be noted that the examples herein are not mutually exclusive. Components from one example may be tacitly assumed to be present in another example and it will be obvious to a person skilled in the art how those components may be used in the other examples. In FIG. 5, optional actions are indicated with dashed boxes.

The detailed description of some of the following corresponds to the same references provided above, in relation to the actions described for the first node 111, and will thus not be repeated here to simplify the description. For example, at least one of the following may apply. In some embodiments, the first node 111 may manage the shim layer or the bootloader. In some embodiments, the third node 113 may manage the SGX Enclave that may run in a VM host, e.g., act as a virtual machine PVE. In some embodiments, the second node 112 may manage an SGX Enclave that may be tasked to process a workload, e.g., running on a guest VM. In some embodiments, the hardware-based secure environment 116 may be a TPM. In some embodiments, the information may be CPUID information.

Action 501

The method comprises, in this Action 501, retrieving, by the first node 111, the information from the processor 115, before the hypervisor is loaded during the boot sequence.

Action 502

The method comprises, in this Action 502 determining, by the first node 111, the first digest of the information by using the algorithm supported by the hardware-based secure environment 116, associated to the processor 115.

Action 503

The method comprises, in this Action 503 extending, by the first node 111, the predefined and reserved PCR values at the hardware-based secure environment 116 with the determined first digest. The first node 111 thereby initiates indicating the one or more features supported by the processor 115 to the second node 112 operating in the computing system 100, based on the determined first digest and the extended PCR.

Action 504

The method may comprise, in this Action 504, establishing, by the third node 113, the authenticated and integrity protected channel to the hardware-based secure environment 116, associated to the processor 115.

Action 505

The method comprises, in this Action this Action 505, the third node 113 retrieving, by the third node 113, the predefined and reserved PCR values from the hardware-based secure environment 116.

The retrieving in this Action 505 may be performed after the hypervisor has been loaded during the boot sequence.

Action 506

The method may comprise, in this Action 506, retrieving, by the third node 113, the information from the processor 115, after the hypervisor is loaded during the boot sequence.

Action 507

The method may comprise, in this Action 507, generating, by the third node 113, the second digest of the retrieved information.

Action 508

The method comprises, in this Action 508, validating, by the third node 113, that the second digest of the information matches the values stored in the PCR. The validating in this Action 508 may be understood to be based on the retrieved information. That is, the third node 113 may validate that the second digest of the retrieved information matches the values stored in the PCR.

Thereby the method comprises initiating, by the third node 113, indicating the information, e.g., the one or more features supported by the processor 115, to the second node 112 based on the validated digest.

Action 509

The method may comprise, in this Action 509, obtaining, by the third node 113, the one of the incremented monotonic count as the first count or the first time stamp from the trusted source.

Action 510

The method may comprise, in this 510, generating, by the third node 113, the first attestation quote comprising the validated information.

The generated first attestation quote may comprise the information and the obtained one of the first monotonic count and the first time stamp from the trusted source.

Action 511

The method may comprise, in this Action 511, storing, by the third node 113, in the storage 120, the generated first attestation quote.

Action 512

The method may comprise, in this Action 512, fetching, by the second node 112, from the storage 120, the first attestation quote comprising the information, the one of the first monotonic count and the first time stamp from the trusted source, and the PCK certificate.

Action 513

The method may comprise, in this Action this Action 513, obtaining, by the second node 112, the one of a second monotonic count and the second time stamp from the trusted source.

Action 514

The method may comprise, in this Action 514 validating, by the second node 112, the fetched first attestation quote by: i) generating the second attestation quote, ii) determining whether or not the PCK certificate is valid, and the signature in the fetched first attestation quote is validated against the PCK Certificate, and iii) determining whether or not at least one of: a) the first monotonic count equals the second monotonic count, and b) the difference between the second time stamp and the first time stamp is within the threshold.

Action 515

The method may comprise, in this Action 515, extracting, by the second node 112, the information from the fetched first attestation quote with the proviso that the information is validated.

Action 516

The method comprises, in this Action 516 initiating, by the second node 112, providing the virtual machine service based on the indicated information, that is that indicated by the third node (113) after validation in Action 508.

The initiating providing of the virtual machine service by the second node 112 in Action this 516 may be further based on the generated first attestation quote in Action 510.

The initiating providing of the virtual machine service by the second node 112 in Action this 516 may be further based on the stored first attestation quote in Action 511.

The initiating providing of the virtual machine service by the second node 112 in Action this 516 may be further based on the extracted information in Action 515.

Figure 6:
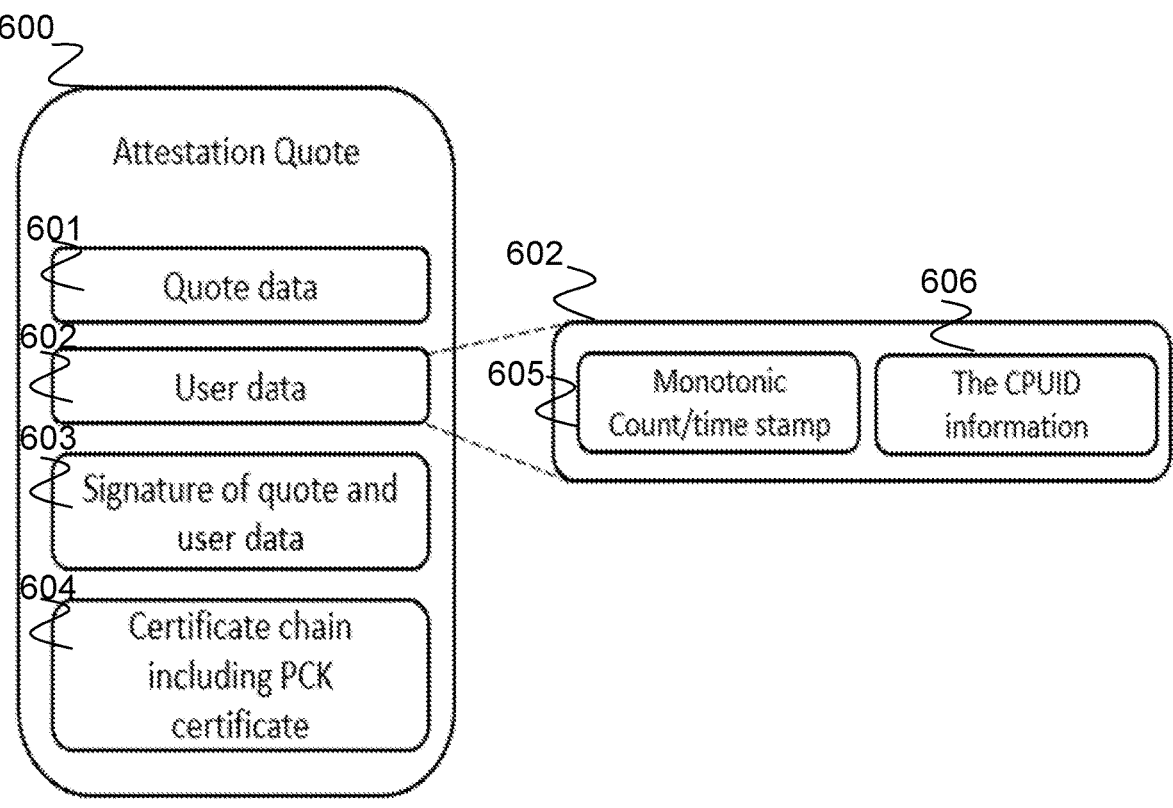
FIG. 6 is a schematic diagram illustrating a non-limiting example of an attestation quote, according to embodiments herein.

FIG. 6 is a schematic diagram depicting a non-limiting example of an attestation quote 600 such the first attestation quote. As depicted in FIG. 6, the attestation quote may comprise several fields, such as quote data 601, user data 602, signature of quote and user data 603 and certificate chain 604, including the PCK certificate. The user data field 602 may comprise a monotonic count and a time stamp 605, and the information, e.g., the CPUID information 606.

Figure 7:
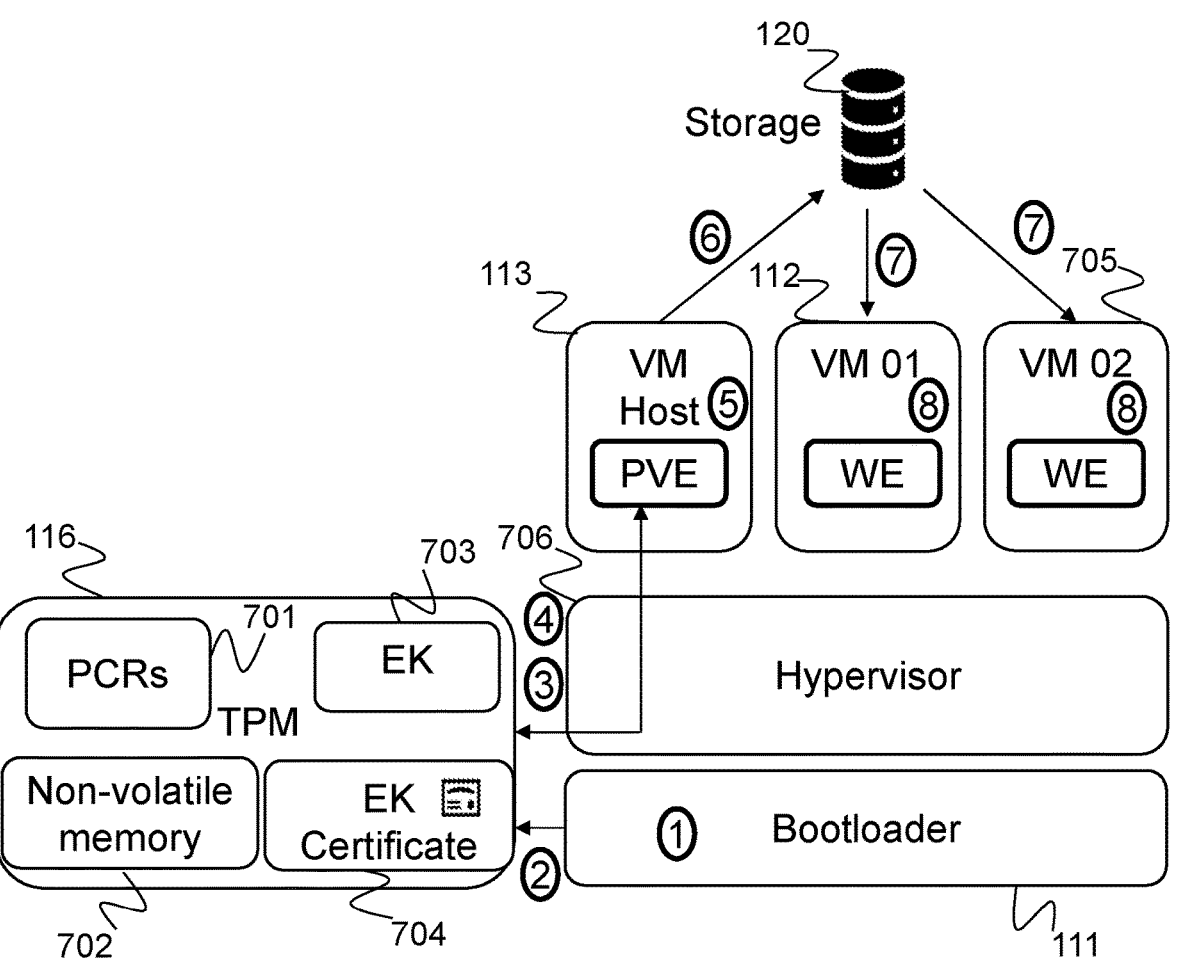
FIG. 7 is a schematic diagram illustrating a non-limiting example of a computing system, according to embodiments herein.

FIG. 7 is a schematic diagram depicting a non-limiting example of a method performed by the computing system 100, according to embodiments herein. In this non-limiting example, the first node 111 is a bootloader, the second node is a WE run in a first VM (VM1), the third node 113 is a Platform Verification Enclave (PVE) running within a VM host, and the hardware-based secure environment 116 is a TPM. The TPM comprises PCRs 701, a non-volatile memory 702, the EK 703, and the EK certificate 704. Also depicted is the storage 120, another second node 112 as a WE running on a second VM (VM 02) 705, and a hypervisor 706. At 1), the first node 111, in accordance with Action 501, retrieves the information about the processor 115 by executing a CPUID instruction. At 2), the first node 111, in accordance with Action 502, calculates the first digest of the CPUID information and populates PCRx where 'x' is a reserved TPM PCR. At 3), the third node 113, in accordance with Action 504, establishes authenticated and integrity protected channel to the TPM. At 4), the third node 113, in accordance with Action 505, fetches PCRx value and the CPUID information. At 5), the third node 113 a) validates, in accordance with Action 508, that the second CPUID information digest matches the value stored in PCRx, b) fetches, in accordance with Action 509, the monotonic count or time stamp from a trusted source, and c) generates, in accordance with Action 510, the first attestation quote by placing the CPUID information and data, generated in step 5*b*, into the user data field of the first attestation quote. At 6), the first attestation quote that includes CPUID information is stored, in accordance with Action 511, in the storage 120, which may be accessed by other VMs. At 7), the second node 112, or other VMs, fetch, in accordance with Action 512, the first attestation quote data. At 8), the second node 112, validates, in accordance with Action 514, the first attestation quote to make sure that it originates from an authentic PVE and is fresh. Upon successful attestation validation, the second node 112 extracts the CPUID information from attestation quote and uses it.

Figure 8:
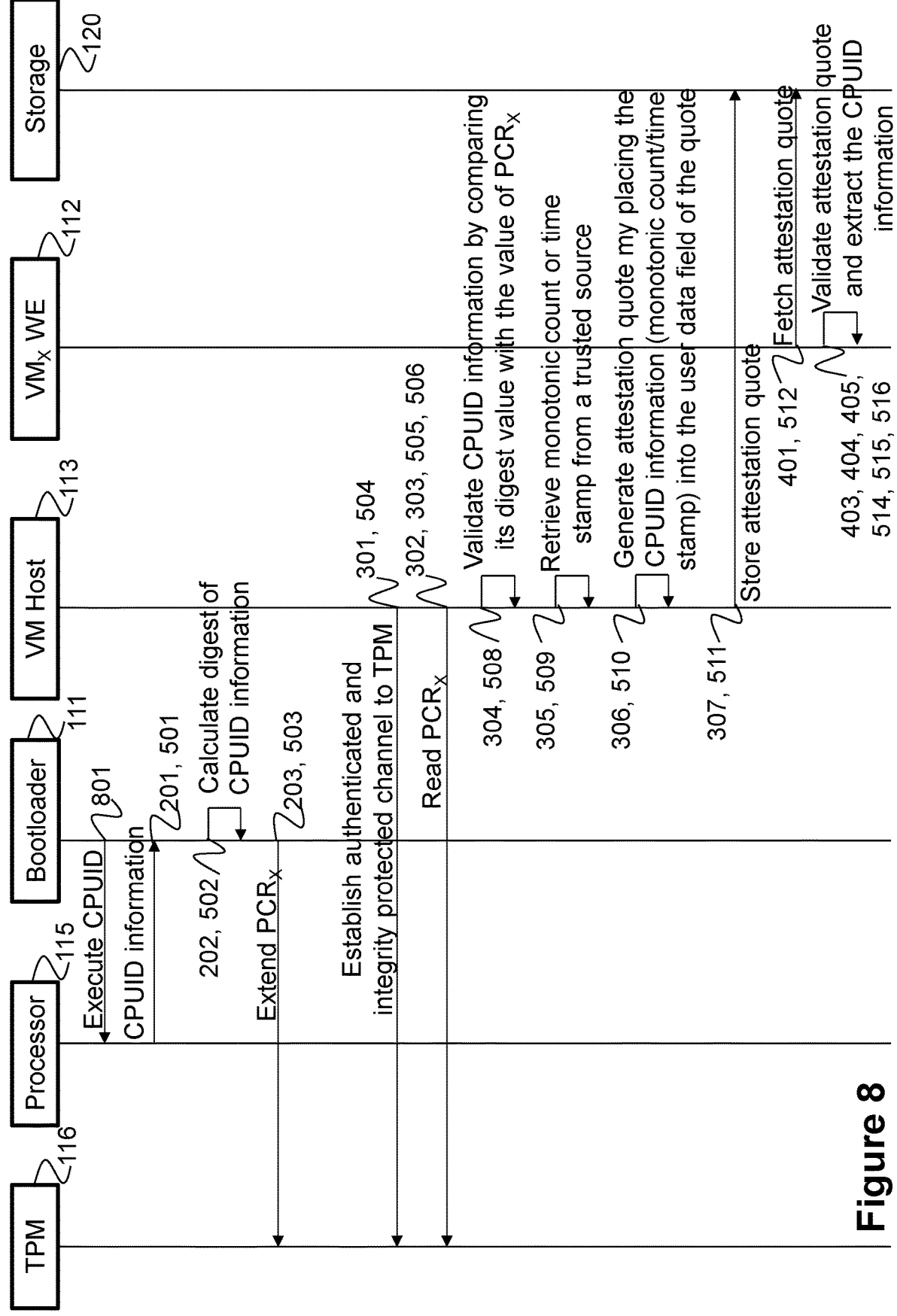
FIG. 8 is a signalling diagram illustrating an example of a method in a computing system, according to embodiments herein.

FIG. 8 is a signalling diagram depicting a non-limiting example of a method performed by the computing system 100, according to embodiments herein. In this non-limiting example, the first node 111 is a bootloader, the second node is a WE run in a first VM (VM1), the third node 113 is a PVE running within the VM host, and the hardware-based secure environment 116 is a TPM. Also depicted is the storage 120 and the processor. At 801), the first node 111, executes a CPUID instruction. Next, in accordance with Action 201 and 501, the first node 111 retrieves the information about the processor 115. The first node 111 then, in accordance with Action 202, 502, calculates the first digest of the CPUID information. Next, the first node 111, in accordance with Action 203 and 503, populates PCRx where 'x' is a reserved TPM PCR. Next, the third node 113, in accordance with Action 301 and 504, establishes authenticated and integrity protected channel to the TPM. The third node 113 then, in accordance with Action 302, 303, 505 and 506, reads the PCRx value and the CPUID information. Next, the third node 113 a) validates, in accordance with Action 304 and 508, that the second CPUID information digest matches the value stored in PCRx, then b) fetches, in accordance with Action 305 and 509, the monotonic count or time stamp from a trusted source, and generates, in accordance with Action 306 and 510, the first attestation quote by placing the CPUID information and data, generated in step b, e.g., monotonic count and time stamp, into the user data field of the first attestation quote. Next, the first attestation quote that includes CPUID information is stored by the third node 113, in accordance with Action 307 and 511, in the storage 120, which may be accessed by other VMs. Subsequently, the second node 112, or other VMs, fetch, in accordance with Action 401 and 512, the first attestation quote data. The second node 112 then validates, in accordance with Action 403 and 514, the first attestation quote to make sure that it originates from an authentic PVE and is fresh. Upon successful attestation validation, the second node 112 extracts the CPUID information from attestation quote in accordance with Action 404 and 514 and uses it, in accordance with Action 415 and 516.

One advantage of embodiments herein is that they may allow retrieval of CPUID information in an environment in which hypervisor and/or host OS may be considered as malicious. Embodiments herein may provide capabilities for "trusted CPUID".

Figure 9:
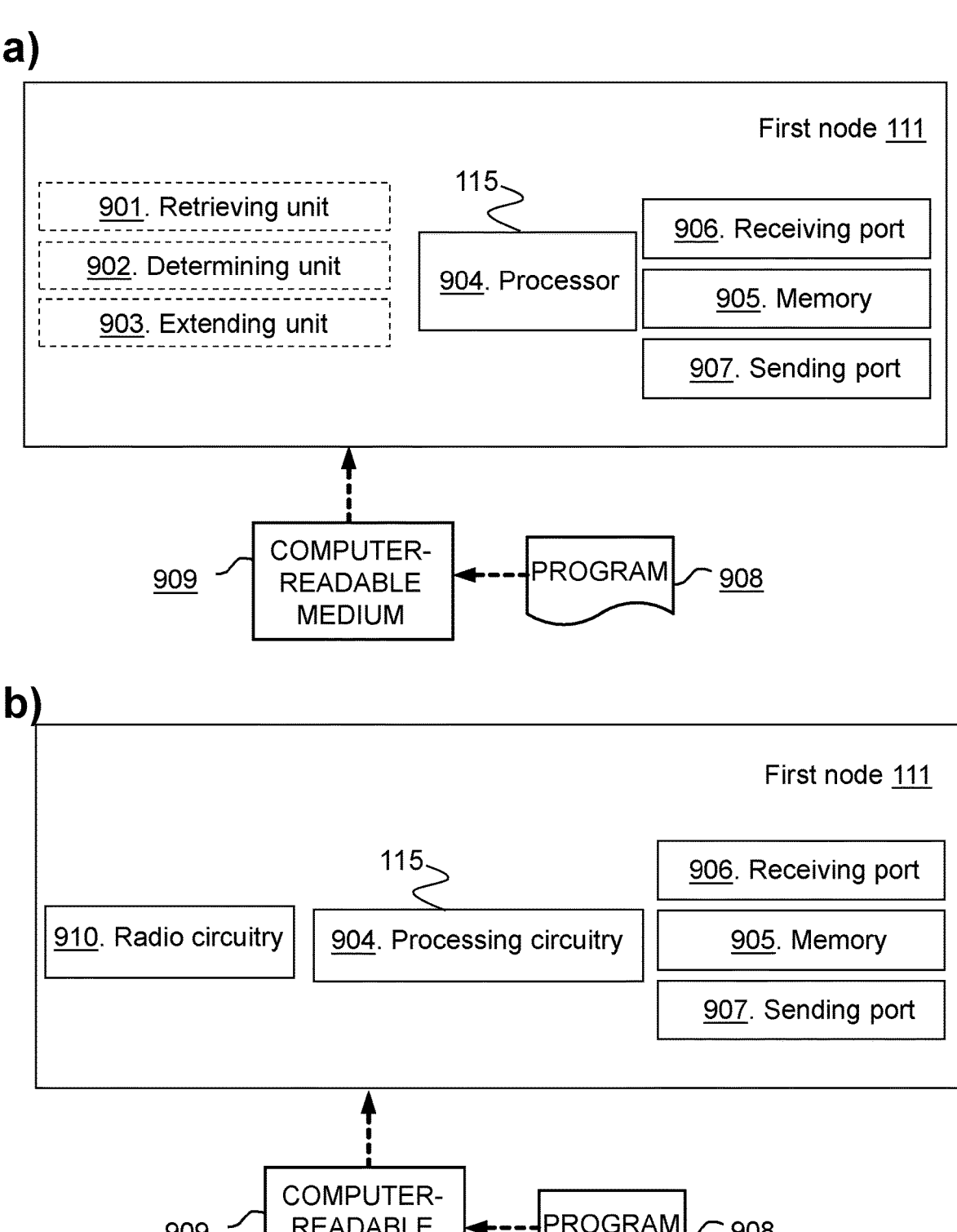
FIG. 9 is a schematic block diagram illustrating two non-limiting examples, a) and b), of a first node, according to embodiments herein.

FIG. 9 depicts two different examples in panels a) and b), respectively, of the arrangement that the first node 111 may comprise to perform the method actions described above in relation to FIG. 2. In some embodiments, the first node 111 may comprise the following arrangement depicted in FIG. 9*a*. The first node 111 may be understood to be for handling the information configured to indicate the one or more features configured to be supported by the processor 115 configured to be used by the first node 111. The first node 111 is configured to operate in the computing system 100.

Several embodiments are comprised herein. Components from one embodiment may be tacitly assumed to be present in another embodiment and it will be obvious to a person skilled in the art how those components may be used in the other exemplary embodiments. The detailed description of some of the following corresponds to the same references provided above, in relation to the actions described for the first node 111, and will thus not be repeated here. For example, the information may be configured to be CPUID information.

In FIG. 9, optional modules are indicated with dashed boxes.

The first node 111 is configured to, e.g. by means of a retrieving unit 901 within the first node 111 configured to, retrieve the information from the processor 115, before the hypervisor is configured to be loaded during the boot sequence.

The first node 111 may be further configured to, e.g. by means of a determining unit 902 within the first node 111 further configured to, determine the first digest of the information by using the algorithm configured to be supported by the hardware-based secure environment 116, configured to be associated to the processor 115.

The first node 111 is also configured to, e.g. by means of an extending unit 903 within the first node 111 configured to, extend predefined and reserved PCR values at the hardware-based secure environment 116 with the first digest configured to be determined. The first node 111 is thereby configured to initiate indicating the one or more features configured to be supported by the processor 115 to the second node 112 configured to operate in the computing system 100 based on the first digest configured to be determined and the PCR configured to be extended.

In some embodiments, at least one of the following may apply: a) the first node 111 may be configured to manage the shim layer or the bootloader, b) the hardware-based secure environment 116 may be the TPM, and c) the information may be configured to be the CPUID information.

The embodiments herein may be implemented through one or more processors, such as a processor 904 in the first node 111 depicted in FIG. 9, together with computer program code for performing the functions and actions of the embodiments herein. The program code mentioned above may also be provided as a computer program product, for instance in the form of a data carrier carrying computer program code for performing the embodiments herein when being loaded into the in the first node 111. One such carrier may be in the form of a CD ROM disc. It is however feasible with other data carriers such as a memory stick. The computer program code may furthermore be provided as pure program code on a server and downloaded to the first node 111.

The processor 904 may be understood to correspond to the processor 115.

The first node 111 may further comprise a memory 905 comprising one or more memory units. The memory 905 is arranged to be used to store obtained information, store data, configurations, schedulings, and applications etc. to perform the methods herein when being executed in the first node 111.

In some embodiments, the first node 111 may receive information, through a receiving port 906. In other embodiments, the first node 111 may receive information from another structure in the computing system 100 through the receiving port 906. Since the receiving port 906 may be in communication with the processor 904, the receiving port 906 may then send the received information to the processor 904. The receiving port 906 may also be configured to receive other information.

The processor 904 in the first node 111 may be further configured to transmit or send information through a sending port 907, which may be in communication with the processor 904, and the memory 905.

Those skilled in the art will also appreciate that the units 901-903 described above may refer to a combination of analog and digital circuits, and/or one or more processors configured with software and/or firmware, e.g., stored in memory, that, when executed by the one or more processors such as the processor 904, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Those skilled in the art will also appreciate that any of the units 901-903 described above may be the processor 904 of the first node 111, or an application running on such processor 904.

Thus, the methods according to the embodiments described herein for the first node 111 may be respectively implemented by means of a computer program 908 product, comprising instructions, i.e., software code portions, which, when executed on at least one processor 904, cause the at least one processor 904 to carry out the actions described herein, as performed by the first node 111. The computer program 908 product may be stored on a computer-readable storage medium 909. The computer-readable storage medium 909, having stored thereon the computer program 908, may comprise instructions which, when executed on at least one processor 904, cause the at least one processor 904 to carry out the actions described herein, as performed by the first node 111. In some embodiments, the computer-readable storage medium 909 may be a non-transitory computer-readable storage medium, such as a CD ROM disc, a memory stick, or stored in the cloud space. In other embodiments, the computer program 908 product may be stored on a carrier containing the computer program, wherein the carrier is one of an electronic signal, optical signal, radio signal, or the computer-readable storage medium 909, as described above.

The first node 111 may comprise an interface unit to facilitate communications between the first node 111 and other nodes or devices, e.g., the first first node 111. In some particular examples, the interface may, for example, include a transceiver configured to transmit and receive radio signals over an air interface in accordance with a suitable standard.

In other embodiments, the first node 111 may comprise the following arrangement depicted in FIG. 9b. The first node 111 may comprise a processing circuitry 904, e.g., one or more processors such as the processor 904, in the first node 111 and the memory 905. The first node 111 may also comprise a radio circuitry 910, which may comprise e.g., the receiving port 906 and the sending port 907. The processing circuitry 904 may be configured to, or operable to, perform the method actions according to FIG. 2, FIG. 5 or any of FIG. 6-8, in a similar manner as that described in relation to FIG. 4a. The radio circuitry 411 may be configured to set up and maintain at least a wireless connection with another entity. Circuitry may be understood herein as a hardware component.

Hence, embodiments herein also relate to the first node 111 operative to handle the information configured to indicate the one or more features supported by the processor 115 used by the first node 111. The first node 111 may be operative to operate in the computing system 100. The first node 111 may comprise the processing circuitry 904 and the memory 905, said memory 905 containing instructions executable by said processing circuitry 904, whereby the first node 111 is further operative to perform the actions described herein in relation to the first node 111, e.g., in FIG. 2, FIG. 5 or any of FIG. 6-8.

Figure 10:
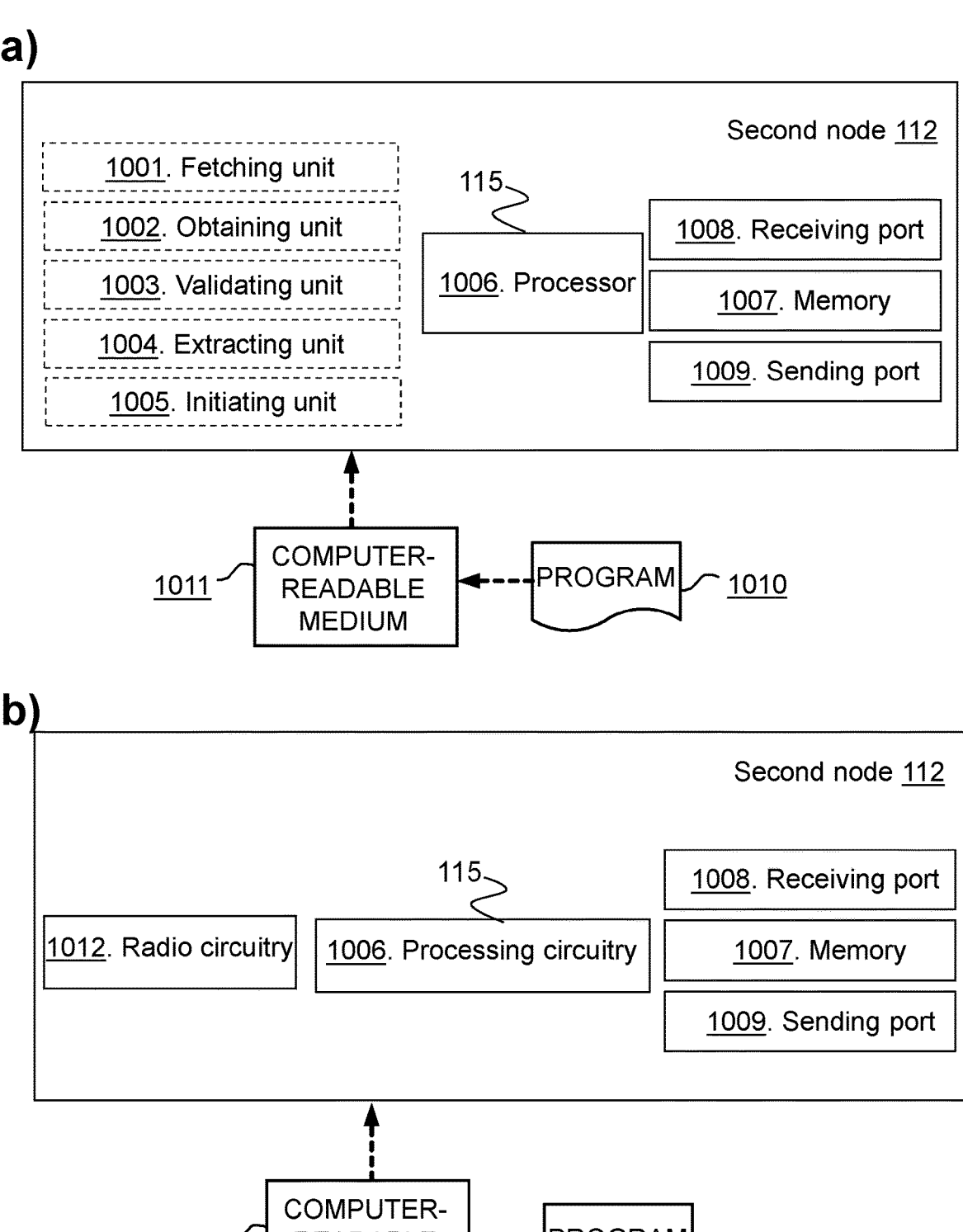
FIG. 10 is a schematic block diagram illustrating two non-limiting examples, a) and b), of a second node, according to embodiments herein.

FIG. 10 depicts two different examples in panels a) and b), respectively, of the arrangement that the second node 112 may comprise to perform the method actions described above in relation to FIG. 4. In some embodiments, the second node 112 may comprise the following arrangement depicted in FIG. 10*a*. The second node 112 may be understood to be for handling the information indicating the one or more features configured to be supported by the processor 115 configured to be used by the second node 112. The second node 112 is configured to operate in the computing system 100.

Several embodiments are comprised herein. Components from one embodiment may be tacitly assumed to be present in another embodiment and it will be obvious to a person skilled in the art how those components may be used in the other exemplary embodiments. The detailed description of some of the following corresponds to the same references provided above, in relation to the actions described for the second node 112, and will thus not be repeated here. For example, the information may be configured to be CPUID information.

In FIG. 10, optional modules are indicated with dashed boxes.

The second node 112 is configured to, e.g. by means of a fetching unit 1001 within the second node 112 configured to, fetch, from the storage 120, the first attestation quote configured to comprise the information, the one of the first monotonic count and the first time stamp from the trusted source, and the PCK certificate.

The second node 112 is further configured to, e.g. by means of an obtaining unit 1002 within the second node 112 configured to, obtain the one of the second monotonic count or the second time stamp from the trusted source.

The second node 112 is further configured to, e.g., by means of a validating unit 1003 within the second node 112 configured to, validate the first attestation quote configured to be by fetched: i) generating the second attestation quote, ii) determining whether or not the PCK certificate is valid, and the signature in the fetched first attestation quote is validated against the PCK Certificate, and iii) determining whether or not at least one of: a) the first monotonic count equals the second monotonic count, and b) the difference between the second time stamp and the first time stamp is within the threshold.

The second node 112 is further configured to, e.g. by means of an extracting unit 1004 within the second node 112 configured to, extract the information from the first attestation quote configured to be fetched with the proviso that the first attestation quote configured to be fetched is validated.

The second node 112 is further configured to, e.g. by means of an initiating unit 1005 within the second node 112 configured to, initiate providing the virtual machine service based on the information configured to be extracted.

In some embodiments at least one of the following may apply: a) the second node 112 may be configured to manage a SGX Enclave that may be configured to be tasked to process the workload, e.g., an SGX Enclave configured to run on a guest VM, and b) the information may be configured to be CPUID information.

The embodiments herein may be implemented through one or more processors, such as a processor 1006 in the second node 112 depicted in FIG. 10, together with computer program code for performing the functions and actions of the embodiments herein. The program code mentioned above may also be provided as a computer program product, for instance in the form of a data carrier carrying computer program code for performing the embodiments herein when being loaded into the in the second node 112. One such carrier may be in the form of a CD ROM disc. It is however feasible with other data carriers such as a memory stick. The computer program code may furthermore be provided as pure program code on a server and downloaded to the second node 112.

The processor 1006 may be understood to correspond to the processor 115.

The second node 112 may further comprise a memory 1007 comprising one or more memory units. The memory 1007 is arranged to be used to store obtained information, store data, configurations, schedulings, and applications etc. to perform the methods herein when being executed in the second node 112.

In some embodiments, the second node 112 may receive information through a receiving port 1008. In other embodiments, the second node 112 may receive information from another structure in the computing system 100 through the receiving port 1008. Since the receiving port 1008 may be in communication with the processor 1006, the receiving port 1008 may then send the received information to the processor 1006. The receiving port 1008 may also be configured to receive other information.

The processor 1006 in the second node 112 may be further configured to transmit or send information through a sending port 1009, which may be in communication with the processor 1006, and the memory 1007.

Those skilled in the art will also appreciate that the units 1001-1007, described above may refer to a combination of analog and digital circuits, and/or one or more processors configured with software and/or firmware, e.g., stored in memory, that, when executed by the one or more processors such as the processor 1006, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Those skilled in the art will also appreciate that any of the units 1001-1007, described above may be the processor 1006 of the second node 112, or an application running on such processor 1006.

Thus, the methods according to the embodiments described herein for the second node 112 may be respectively implemented by means of a computer program 1010 product, comprising instructions, i.e., software code portions, which, when executed on at least one processor 1006, cause the at least one processor 1006 to carry out the actions described herein, as performed by the second node 112. The computer program 1010 product may be stored on a computer-readable storage medium 1011. The computer-readable storage medium 1011, having stored thereon the computer program 1010, may comprise instructions which, when executed on at least one processor 1006, cause the at least one processor 1006 to carry out the actions described herein, as performed by the second node 112. In some embodiments, the computer-readable storage medium 1011 may be a non-transitory computer-readable storage medium, such as a CD ROM disc, a memory stick, or stored in the cloud space. In other embodiments, the computer program 1010 product may be stored on a carrier containing the computer program, wherein the carrier is one of an electronic signal, optical signal, radio signal, or the computer-readable storage medium 1011, as described above.

The second node 112 may comprise an interface unit to facilitate communications between the second node 112 and other nodes or devices. In some particular examples, the interface may, for example, include a transceiver configured to transmit and receive radio signals over an air interface in accordance with a suitable standard.

In other embodiments, the second node 112 may comprise the following arrangement depicted in FIG. 10*b*. The second node 112 may comprise a processing circuitry 1006, e.g., one or more processors such as the processor 1006, in the second node 112 and the memory 1007. The second node 112 may also comprise a radio circuitry 1012, which may comprise e.g., the receiving port 1008 and the sending port 1009. The processing circuitry 1006 may be configured to, or operable to, perform the method actions according to FIG. 4, FIG. 5 or any of FIG. 6-8, in a similar manner as that described in relation to FIG. 6*a*. The radio circuitry 1012 may be configured to set up and maintain at least a wireless connection. Circuitry may be understood herein as a hardware component.

Hence, embodiments herein also relate to the second node 112 operative to handle the information configured to indicate the one or more features supported by the processor 115 used by the second node 112. The second node 112 may be operative to operate in the computing system 100. The second node 112 may comprise the processing circuitry 1006 and the memory 1007, said memory 1007 containing instructions executable by said processing circuitry 1006, whereby the second node 112 is further operative to perform the actions described herein in relation to the second node 112, e.g., in FIG. 4, FIG. 5 or any of FIG. 6-8.

Figure 11:
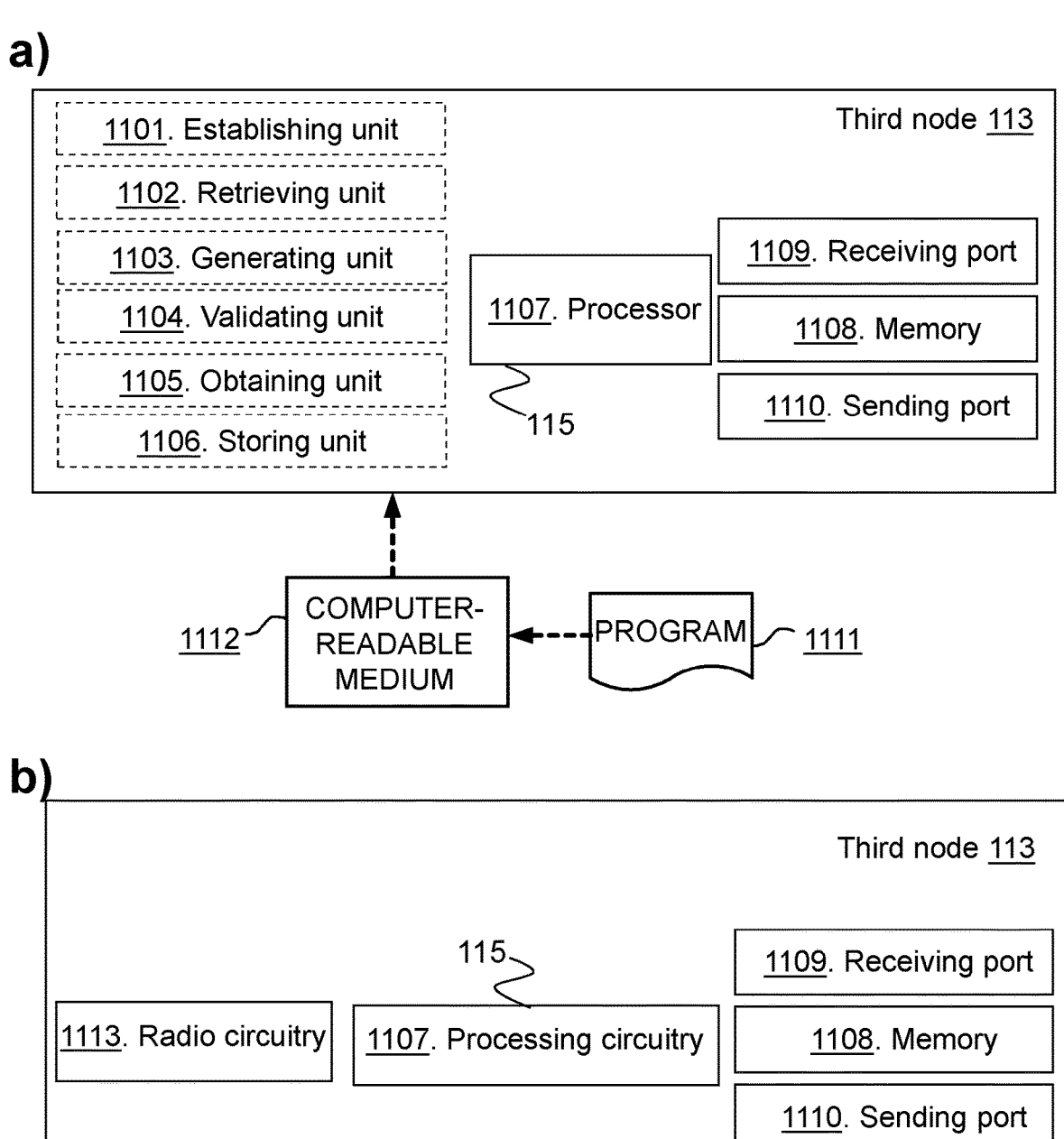
FIG. 11 is a schematic block diagram illustrating two non-limiting examples, a) and b), of a third node, according to embodiments herein.

FIG. 11 depicts two different examples in panels a) and b), respectively, of the arrangement that the third node 113 may comprise to perform the method actions described above in relation to FIG. 3. In some embodiments, the third node 113 may comprise the following arrangement depicted in FIG. 11*a*. The third node 113 may be understood to be for handling the information indicating the one or more features configured to be supported by the processor 115 configured to be used by the third node 113. The third node 113 is configured to operate in the computing system 100.

Several embodiments are comprised herein. Components from one embodiment may be tacitly assumed to be present in another embodiment and it will be obvious to a person skilled in the art how those components may be used in the other exemplary embodiments. The detailed description of some of the following corresponds to the same references provided above, in relation to the actions described for the third node 113, and will thus not be repeated here. For example, the information may be configured to be CPUID information.

In FIG. 11, optional modules are indicated with dashed boxes.

The third node 113 is configured to, e.g. by means of an establishing unit 1101 within the third node 113 configured to, establish the authenticated and integrity protected channel to the hardware-based secure environment 116, configured to be associated to the processor 115.

The third node 113 is further configured to, e.g. by means of a retrieving unit 1102 within the third node 113 configured to, retrieve the predefined and reserved PCR values from the hardware-based secure environment 116. The PCR values are configured to the a first digest of information from the processor 115.

The third node 113 is further configured to, e.g. by means of the retrieving unit 1102 within the third node 113 configured to, retrieve the information from the processor 115.

The third node 113 is further configured to, e.g. by means of a generating unit 1103 within the third node 113 configured to, generate the second digest of the information configured to be retrieved.

The third node 113 is further configured to, e.g., by means of a validating unit 1104 within the third node 113 configured to, validate that the second digest of the information configured to be retrieved matches the values stored in the PCR. The third node 113 is thereby configured to initiate indicating the information to the second node 112 configured to operate in the computing system 100 based on the digest configured to be validated.

The third node 113 may be further configured to, e.g. by means of an obtaining unit 1105 within the third node 113 configured to, obtain the one of the incremented monotonic count as the first count or the first time stamp from the trusted source.

The third node 113 may be further configured to, e.g. by means of the generating unit 1103 within the third node 113 configured to, generate the first attestation quote comprising the information and the one of the first monotonic count and the first time stamp configured to be obtained from the trusted source. In such embodiments, the initiating indicating the information to the second node 112 may be further configured to be based on the first attestation quote configured to be generated.

The third node 113 may be further configured to, e.g. by means of a storing unit 1106 within the third node 113 configured to, store, in the storage 120 the first attestation quote configured to be generated. In such embodiments, the initiating indicating the information may be further configured to be based on the first attestation quote configured to be stored.

In some embodiments at least one of the following may apply: a) the third node 113 may be configured to manage a SGX Enclave that may be configured to run in a VM host, e.g., act as a VM PVE, b) the hardware-based secure environment 116 may be configured to be a TPM, and c) the information may be configured to be CPUID information.

The embodiments herein may be implemented through one or more processors, such as a processor 1107 in the third node 113 depicted in FIG. 11, together with computer program code for performing the functions and actions of the embodiments herein. The program code mentioned above may also be provided as a computer program product, for instance in the form of a data carrier carrying computer program code for performing the embodiments herein when being loaded into the in the third node 113. One such carrier may be in the form of a CD ROM disc. It is however feasible with other data carriers such as a memory stick. The computer program code may furthermore be provided as pure program code on a server and downloaded to the third node 113.

The processor 1107 may be understood to correspond to the processor 115.

The third node 113 may further comprise a memory 1108 comprising one or more memory units. The memory 1108 is arranged to be used to store obtained information, store data, configurations, schedulings, and applications etc. to perform the methods herein when being executed in the third node 113.

In some embodiments, the third node 113 may receive information through a receiving port 1109. In other embodiments, the third node 113 may receive information from another structure in the computing system 100 through the receiving port 1109. Since the receiving port 1109 may be in communication with the processor 1107, the receiving port 1109 may then send the received information to the processor 1107. The receiving port 1109 may also be configured to receive other information.

The processor 1107 in the third node 113 may be further configured to transmit or send information through a sending port 1110, which may be in communication with the processor 1107, and the memory 1108.

Those skilled in the art will also appreciate that the units 1001-1106, described above may refer to a combination of analog and digital circuits, and/or one or more processors configured with software and/or firmware, e.g., stored in memory, that, when executed by the one or more processors such as the processor 1107, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Those skilled in the art will also appreciate that any of the units 1001-1106, described above may be the processor 1107 of the third node 113, or an application running on such processor 1107.

Thus, the methods according to the embodiments described herein for the third node 113 may be respectively implemented by means of a computer program 1111 product, comprising instructions, i.e., software code portions, which, when executed on at least one processor 1107, cause the at least one processor 1107 to carry out the actions described herein, as performed by the third node 113. The computer program 1111 product may be stored on a computer-readable storage medium 1112. The computer-readable storage medium 1112, having stored thereon the computer program 1111, may comprise instructions which, when executed on at least one processor 1107, cause the at least one processor 1107 to carry out the actions described herein, as performed by the third node 113. In some embodiments, the computer-readable storage medium 1112 may be a non-transitory computer-readable storage medium, such as a CD ROM disc, a memory stick, or stored in the cloud space. In other embodiments, the computer program 1111 product may be stored on a carrier containing the computer program, wherein the carrier is one of an electronic signal, optical signal, radio signal, or the computer-readable storage medium 1112, as described above.

The third node 113 may comprise an interface unit to facilitate communications between the third node 113 and other nodes or devices. In some particular examples, the interface may, for example, include a transceiver configured to transmit and receive radio signals over an air interface in accordance with a suitable standard.

In other embodiments, the third node 113 may comprise the following arrangement depicted in FIG. 11*b*. The third node 113 may comprise a processing circuitry 1107, e.g., one or more processors such as the processor 1107, in the third node 113 and the memory 1108. The third node 113 may also comprise a radio circuitry 1113, which may comprise e.g., the receiving port 1109 and the sending port 1110. The processing circuitry 1107 may be configured to, or operable to, perform the method actions according to FIG. 3, FIG. 5 or any of FIG. 6-8, in a similar manner as that described in relation to FIG. 6*a*. The radio circuitry 1113 may be configured to set up and maintain at least a wireless connection. Circuitry may be understood herein as a hardware component.

Hence, embodiments herein also relate to the third node 113 operative to handle the information configured to indicate the one or more features supported by the processor 115 used by the third node 113. The third node 113 may be operative to operate in the computing system 100. The third node 113 may comprise the processing circuitry 1107 and the memory 1108, said memory 1108 containing instructions executable by said processing circuitry 1107, whereby the third node 113 is further operative to perform the actions described herein in relation to the third node 113, e.g., in FIG. 3, FIG. 5 or any of FIG. 6-8.

Figure 12:
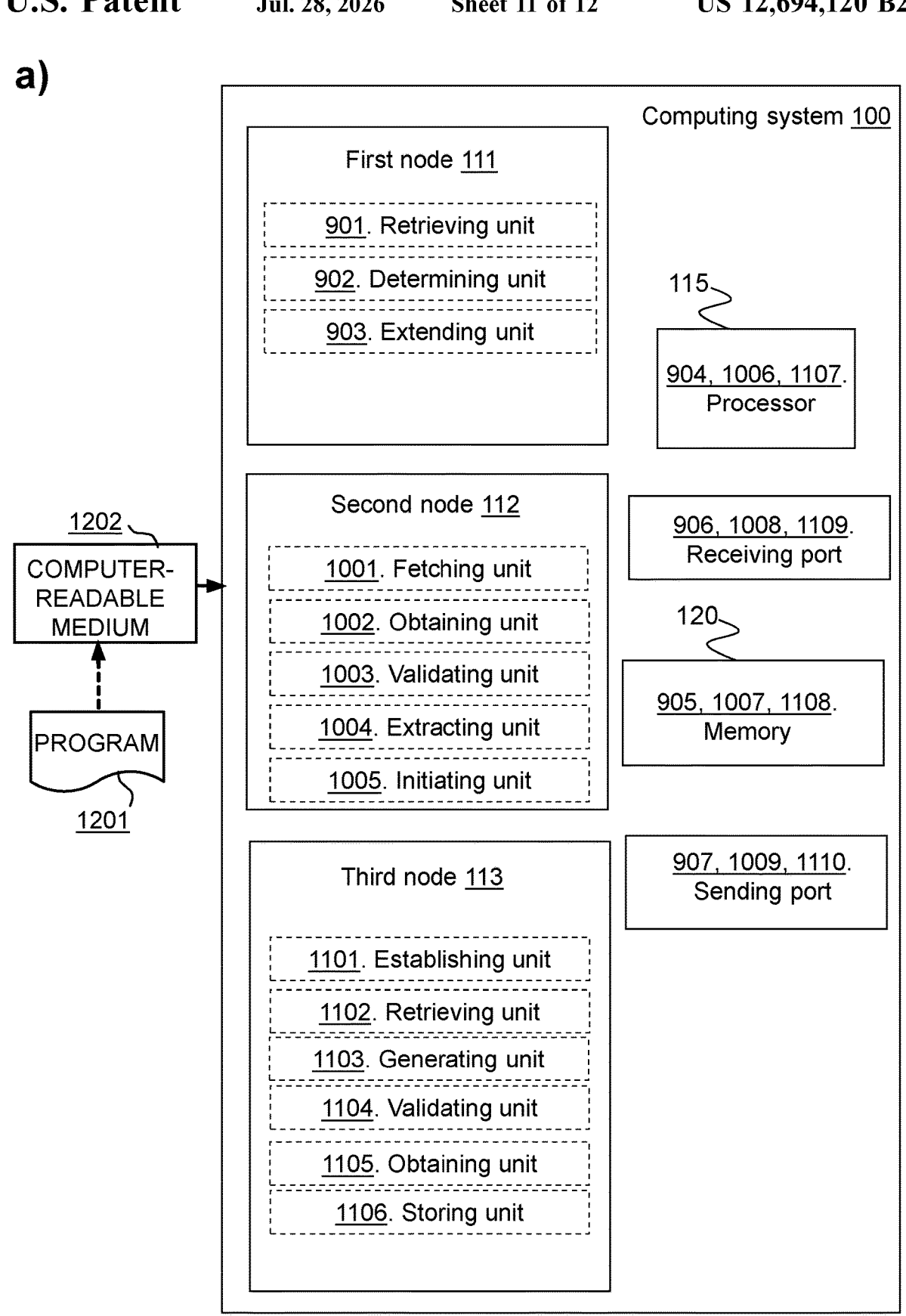
FIG. 12 is a schematic block diagram illustrating two non-limiting examples, a) and b), of a computing system, according to embodiments herein.
Figure 12:
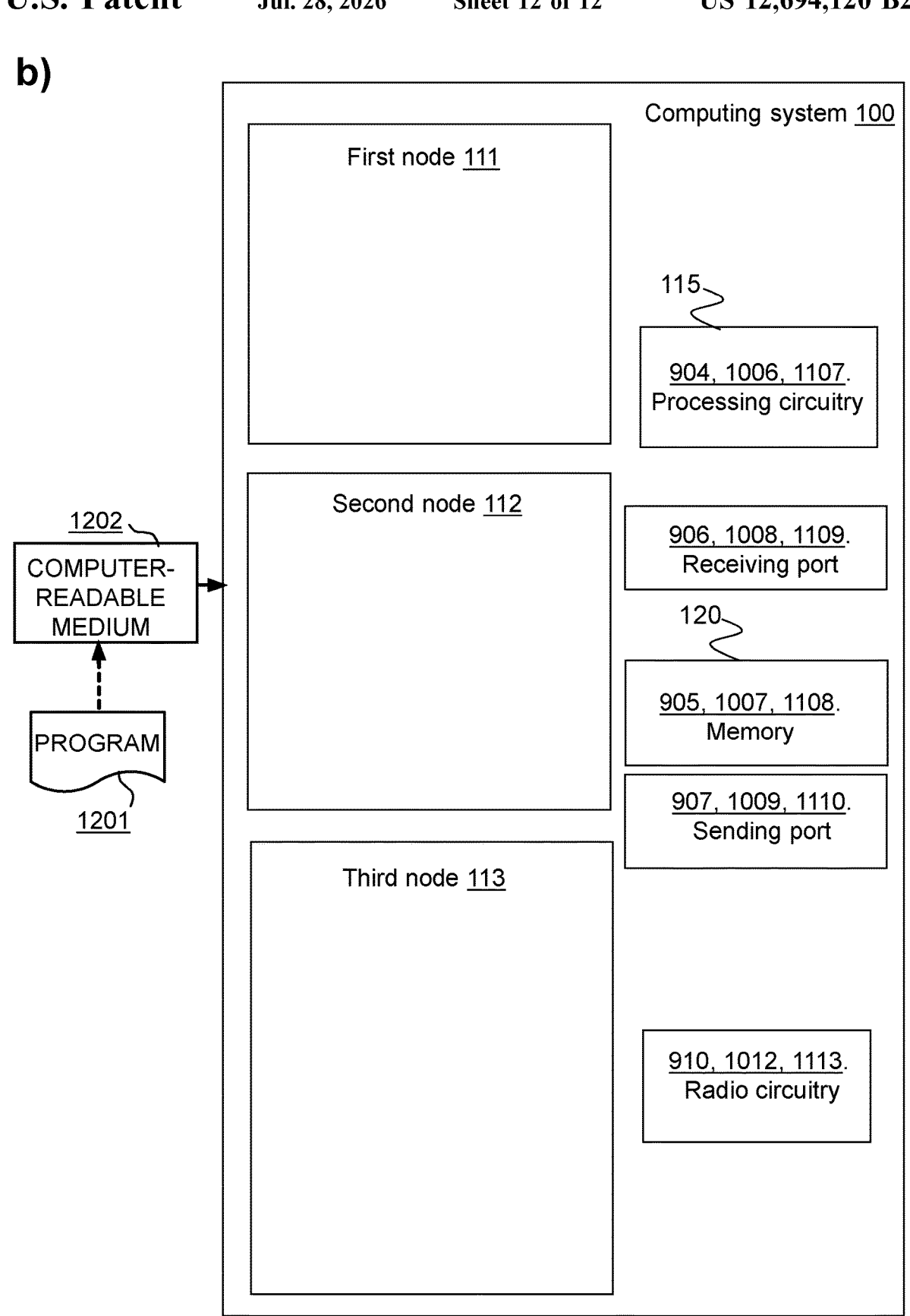

FIG. 12 depicts two different examples in panels a) and b), respectively, of the arrangement that the computing system 100 may comprise to perform the method actions described above in relation to FIG. 5 or any of FIG. 6-8. The arrangement depicted in panel a) corresponds to that described in relation to panel a) in FIG. 11, FIG. 12 and FIG. 13 for each of the first node 111, the second node 112 and the third node 113, respectively. The arrangement depicted in panel b) corresponds to that described in relation to panel b) in FIG. 11, FIG. 12 and FIG. 13 for each of the first node 111, the second node 112 and the third node 113, respectively. The computing system 100 may be for handling information indicating the one or more features configured to be supported by the processor 115 configured to be comprised in the computing system 100. The computing system 100 is configured to comprise the first node 111, the second node 112 and the third node 113.

The computing system 100 is configured to, e.g. by means of the retrieving unit 901 within the first node 111 configured to, retrieve, by the first node 111, the information from the processor 115, before the hypervisor is configured to be loaded during the boot sequence.

The computing system 100 is also configured to, e.g. by means of the determining unit 902 within the first node 111 configured to, determine, by the first node 111, the first digest of the information by using the algorithm configured to be supported by the hardware-based secure environment 116, configured to be associated to the processor 115.

The computing system 100 is configured to, e.g. by means of the extending unit 903 within the first node 111 configured to, extend, by the first node 111, predefined and reserved PCR values at the hardware-based secure environment 116 with the first digest configured to be determined. The first node is thereby configured to initiate indicating the one or more features configured to be supported by the processor 115 to the second node 112 configured to operate in the computing system 100 based on the first digest configured to be determined and the PCR configured to be extended.

The computing system 100 is also configured to, e.g. by means of the retrieving unit 1102 within the third node 113 configured to, retrieve, by the third node 113, the predefined and reserved PCR values from the hardware-based secure environment 116.

The computing system 100 is configured to, e.g. by means of the validating unit 1104 within the third node 113 configured to, validate, by the third node 113, that the second digest of the information matches the values stored in the PCR. The third node 113 is thereby configured to initiate indicating the information to the second node 112 based on the digest configured to be validated.

The computing system 100 is also configured to, e.g. by means of the initiating unit 1005 within the second node 112 configured to, initiate, by the second node 112, providing the virtual machine service based on the information configured to be indicated.

The computing system 100 may be further configured to, e.g. by means of the establishing unit 1101 within the third node 113 configured to, establish, by the third node 113, the authenticated and integrity protected establish, by the third node 113, an authenticated and integrity protected channel to the hardware-based secure environment 116, configured to be associated to the processor 115 channel to the hardware-based secure environment 116, configured to be associated to the processor 115.

The computing system 100 may be further configured to, e.g. by means of the retrieving unit 1102 within the third node 113 further configured to retrieve, by the third node 113, the information from the processor 115.

The computing system 100 may be further configured to, e.g., by means of the generating unit 1103 within the third node 113 configured to, generate, by the third node 113, the second digest of the information configured to be retrieved. The validating may be configured to be based on the information configured to be retrieved.

The computing system 100 may be further configured to, e.g., by means of the generating unit 1103 within the third node 113 configured to, generate, by the third node 113, the first attestation quote configured to comprise the information configured to be validated.

The computing system 100 may be further configured to, e.g. by means of the fetching unit 1001 within the second node 112 configured to, fetch, by the second node 112, from the storage 120, the first attestation quote configured to comprise the information. The initiating providing of the virtual machine service to the second node 112 may be further configured to be based on the first attestation quote.

The computing system 100 may be further configured to, e.g. by means of the obtaining unit 1105 within the third node 113 configured to, obtain, by the third node 113, the one of the incremented monotonic count as the first count or the first time stamp from the trusted source.

In some embodiments, the first attestation quote configured to be generated may be configured to comprise the information and the one of the first monotonic count and the first time stamp configured to be obtained from the trusted source. The initiating providing of the virtual machine service to the second node 112 may be further configured to be based on the first attestation quote configured to be generated.

The computing system 100 may be further configured to, e.g. by means of the storing unit 1107 within the third node 113 configured to, store, by the third node 113, in the storage 120, the first attestation quote configured to be generated. The initiating providing of the virtual machine service to the second node 112 may be further configured to be based on the first attestation quote configured to be stored.

The computing system 100 may be further configured to, e.g. by means of the fetching unit 1001 within the second node 112 configured to, fetch, by the second node 112, from the storage 120, the first attestation quote configured to comprise the information, the one of the first monotonic count and the first time stamp from the trusted source, and the PCK certificate.

The computing system 100 may be further configured to, e.g. by means of the obtaining unit 1002 within the second node 112 configured to, obtain, by the second node 112, one of the second monotonic count and the second time stamp from the trusted source.

The computing system 100 may be further configured to, e.g. by means of the validating unit 1003 within the second node 112 configured to, validate, by the second node 112, the first attestation quote configured to be fetched by: i) generating the second attestation quote, and ii) determining whether or not the PCK certificate is valid, and the signature in the fetched first attestation quote is validated against the PCK Certificate, and iii) determining whether or not at least one of: a) the first monotonic count equals the second monotonic count, and b) the difference between the second time stamp and the first time stamp is within the threshold.

The computing system 100 may be further configured to, e.g. by means of the extracting unit 1004 within the second node 112 configured to, extract, by the second node 112, the information from the first attestation quote configured to be fetched with the proviso that the first attestation quote configured to be fetched is validated.

In some embodiments, the initiating, by the second node 112, providing the virtual machine service may be configured to be based on the information configured to be extracted.

In some embodiments at least one of the following may apply: a) the first node 111 may be configured to manage the shim layer or the bootloader, b) the third node 113 may be configured to manage the SGX Enclave that may be configured to run in a VM host, e.g., that may act as the VM PVE, c) the second node 112 may be configured to be the SGX Enclave that may be configured to be tasked to process the workload, e.g., an SGX Enclave configured to run on a guest VM, d) the hardware-based secure environment 116 may be the TPM, and e) the information may be configured to be CPUID information.

The remaining configurations described for the first node 111, the one or more second nodes 112 and the third node 113 in relation to FIG. 12, may be understood to correspond to those described in FIG. 9, FIG. 10 and FIG. 11, respectively, and to be performed, e.g., by means of the corresponding units and arrangements described in FIG. 9, FIG. 10 and FIG. 11, which will not be repeated here.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

As used herein, the expression "at least one of:" followed by a list of alternatives separated by commas, and wherein the last alternative is preceded by the "and" term, may be understood to mean that only one of the list of alternatives may apply, more than one of the list of alternatives may apply or all of the list of alternatives may apply. This expression may be understood to be equivalent to the expression "at least one of:" followed by a list of alternatives separated by commas, and wherein the last alternative is preceded by the "or" term.

When using the word "comprise" or "comprising", it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention.

As used herein, the expression "in some embodiments" has been used to indicate that the features of the embodiment described may be combined with any other embodiment or example disclosed herein.

As used herein, the expression "in some examples" has been used to indicate that the features of the example described may be combined with any other embodiment or example disclosed herein.

REFERENCES

1. Intel Corporation. Intel® 64 and IA-32 Architectures Software Developer's Manual, Volume 2A. Chapter 3, "Instruction Set Reference, A-L," CPUID—CPU Identification. p. 214 https://software.intel.com/content/www/us/en/develop/articles/intel-sdm.html
2. Takehisa, T. Nogawa, H., Morii, M. AES Flow Interception: Key Snooping Method on Virtual Machine.—Exception Handling Attack for AES-NI—IACR Cryptology ePrint Archive 2011 https://eprint.iacr.org/2011/428.pdf
3. Advanced Micro Devices, Inc. AMD Secure Encrypted Virtualization-Secure Nested Paging (SEV-SNP): Strengthening VM Isolation with Integrity Protection and More https://www.amd.com/system/files/Tech-Docs/SEV-SNP-strengthening-vm-isolation-with-integrity-protection-and-more.pdf
4. Mechalas, John P. Trusted CPU Feature Detection Library for Intel Software Guard Extensions (Intel SGX), online 2019 https://software.intel.com/content/www/us/en/develop/articles/trusted-cpu-feature-detection-library-for-intel-software-guard-extensions-intel-sgx.html
5. The Trusted Computing Group (TCG), TPM 2.0 Specifications https://trustedcomputinggroup.org/resource/tpm-library-specification/

The invention claimed is:

1. A method, performed by a first node, the method being for handling information indicating one or more features supported by a processor used by the first node, the first node operating in a computing system, the method comprising:

retrieving the information from the processor, before a hypervisor is loaded during a boot sequence, determining a first digest of the information by using an algorithm supported by a hardware-based secure environment, associated to the processor, and extending predefined and reserved Platform Control Register (PCR) values at the hardware-based secure environment with the determined first digest, thereby initiating indicating the one or more features supported by the processor to a second node operating in the computing system based on the determined first digest and the extended PCR.

2. The method according to claim 1, wherein a. the first node manages a shim layer or a bootloader, b. the hardware-based secure environment is a Trusted Platform Module (TPM) and c. the information is Central Processor Unit identification (CPUID) information.

3. A method, performed by a third node, the method being for handling information indicating one or more features supported by a processor used by the third node, the third node operating in a computing system, the method comprising:

establishing an authenticated and integrity protected channel to a hardware-based secure environment, associated to the processor, retrieving predefined and reserved Platform Control Register (PCR) values from the hardware-based secure environment, the PCR values comprising a first digest of information from the processor, retrieving the information from the processor, generating a second digest of the retrieved information, and validating that the second digest of the retrieved information matches the values stored in the PCR, thereby initiating indicating the information to a second node operating in the computing system based on the validated digest.

4. The method according to claim 3, further comprising:

obtaining one of an incremented monotonic count as a first count or a first time stamp from a trusted source, and generating a first attestation quote comprising the information and the obtained one of the first monotonic count and the first time stamp from the trusted source, wherein the initiating indicating the information to the second node is further based on the generated first attestation quote.

5. The method according to claim 4, further comprising:

storing, in a storage the generated first attestation quote, wherein the initiating indicating the information is further based on the stored first attestation quote.

6. The method according to claim 3, wherein at least one of:

a. the third node manages a Software Guard Extensions (SGX) Enclave that runs in a Virtual Machine (VM) host, b. the hardware-based secure environment is a Trusted Platform Module (TPM), and c. the information is Central Processor Unit identification (CPUID) information.

7. A method, performed by a second node, the method being for handling information indicating one or more features supported by a processor used by the second node, the second node operating in a computing system, the method comprising:

fetching, from a storage, a first attestation quote comprising the information, one of a first monotonic count and a first time stamp from a trusted source, and a Provisioning Certification Key (PCK) certificate, obtaining one of a second monotonic count or a second time stamp from the trusted source, validating the fetched first attestation quote by:

i. generating a second attestation quote, ii. determining whether or not the PCK certificate is valid, and a signature in the fetched first attestation quote is validated against the PCK Certificate, and iii. determining whether or not at least one of:

a) the first monotonic count equals the second monotonic count, and b) a difference between the second time stamp and the first time stamp is within a threshold, extracting the information from the fetched first attestation quote with the proviso that the fetched first attestation quote is validated, and initiating providing a virtual machine service based on the extracted information.

8. The method according to claim 7, wherein at least one of:

a. the second node manages a Software Guard Extensions (SGX) Enclave that is tasked to process a workload, and b. the information is Central Processor Unit identification (CPUID) information.

\* \* \* \* \*